(12) United States Patent
Kumar et al.

(10) Patent No.: US 11,798,167 B2
(45) Date of Patent: Oct. 24, 2023

(54) LONG-TERM AND CONTINUOUS ANIMAL BEHAVIORAL MONITORING

(71) Applicant: The Jackson Laboratory, Bar Harbor, ME (US)

(72) Inventors: Vivek Kumar, Bar Harbor, ME (US); Brian Q. Geuther, Bar Harbor, ME (US); Jim Peterson, Bar Harbor, ME (US); Gary Churchill, Bar Harbor, ME (US)

(73) Assignee: The Jackson Laboratory, Bar Harbor, ME (US)

( * ) Notice: Subject to any disclaimer, the term of this patent is extended or adjusted under 35 U.S.C. 154(b) by 0 days.

(21) Appl. No.: 17/715,832

(22) Filed: Apr. 7, 2022

(65) Prior Publication Data
US 2022/0248642 A1 Aug. 11, 2022

Related U.S. Application Data

(63) Continuation of application No. 16/636,392, filed as application No. PCT/US2018/045676 on Aug. 7, 2018, now Pat. No. 11,330,804.
(Continued)

(51) Int. Cl.
*G06T 7/11* (2017.01)
*G06V 10/25* (2022.01)
(Continued)

(52) U.S. Cl.
CPC ............... *G06T 7/11* (2017.01); *A01K 1/031* (2013.01); *A01K 29/005* (2013.01); *G06F 18/28* (2023.01);
(Continued)

(58) Field of Classification Search
None
See application file for complete search history.

(56) References Cited

U.S. PATENT DOCUMENTS 5,792,597 A * 8/1998 Kawai ............... G03B 27/72
430/509
10,176,435 B1 * 1/2019 Sarkar ............... G06N 20/00
(Continued)

FOREIGN PATENT DOCUMENTS

CN 201097536 Y 8/2008
CN 101311947 A 11/2008
(Continued)

OTHER PUBLICATIONS

Bargmann, C., et al., "BRAIN 2025: A Scientific Vision. Brain Research Through Advancing Innovative Neurotechnologies (BRAIN)." Working Group Report to the Advisory Committee to the Director, NIH (2014).
(Continued)

*Primary Examiner* — Mohammed Rachedine
(74) *Attorney, Agent, or Firm* — McDonnell Boehnen Hulbert & Berghoff LLP

(57) ABSTRACT

Systems and methods for continuous monitoring of the behavior of animals, such as small rodents, are provided. Monitoring can include video, audio, and other sensor modalities. In one embodiment, the system can include cameras, arena design, environmental sensors, and ultrasonic sensors. The system uniquely provides a continuous long-term monitoring system suitable for mouse behavioral study. Further provided is a neural network based tracker configured for use with video data acquired by the monitoring system. Three different neural network architectures have been tested to determine their performance on genetically diverse mice under varying environmental conditions. It has been observed that that an encoder-decoder segmen-
(Continued)

tation neural network achieves high accuracy and speed with minimal training data. This general purpose neural network tracker can be easily extended to other experimental paradigms and even to other animals through transfer learning, thus forming a robust, generalizable solution for bio-behavioral research.

24 Claims, 25 Drawing Sheets

Related U.S. Application Data

(60) Provisional application No. 62/661,610, filed on Apr. 23, 2018, provisional application No. 62/542,180, filed on Aug. 7, 2017.

(51) Int. Cl.
```
G06V 10/26      (2022.01)
G06V 10/44      (2022.01)
G06V 10/764     (2022.01)
G06V 10/772     (2022.01)
G06V 10/776     (2022.01)
G06V 10/82      (2022.01)
G06V 20/00      (2022.01)
A01K 1/03       (2006.01)
A01K 29/00      (2006.01)
G06F 18/28      (2023.01)
```

(52) U.S. Cl.
CPC .............. *G06V 10/25* (2022.01); *G06V 10/26* (2022.01); *G06V 10/454* (2022.01); *G06V 10/764* (2022.01); *G06V 10/772* (2022.01); *G06V 10/776* (2022.01); *G06V 10/82* (2022.01); *G06V 20/00* (2022.01)

(56) References Cited

U.S. PATENT DOCUMENTS

| | | | |
|---|---|---|---|
| 10,398,316 B1* | 9/2019 | Betts-Lacroix | A61B 5/4887 |
| 10,810,491 B1* | 10/2020 | Xia | G06N 3/04 |
| 2009/0122058 A1 | 5/2009 | Tschesnok | |
| 2010/0124274 A1 | 5/2010 | Check et al. | |
| 2010/0277316 A1* | 11/2010 | Schlangen | F21S 10/02 315/312 |
| 2010/0324861 A1 | 12/2010 | Goulding et al. | |
| 2011/0279640 A1* | 11/2011 | Choi | H04N 7/147 348/14.12 |
| 2012/0150651 A1 | 6/2012 | Hoffberg et al. | |
| 2013/0285815 A1 | 10/2013 | Jones | |
| 2014/0046195 A1* | 2/2014 | Schibler | G01N 21/763 600/476 |
| 2014/0285667 A1 | 9/2014 | Airnura | |
| 2015/0110388 A1 | 4/2015 | Eaton et al. | |
| 2016/0004931 A1 | 1/2016 | Andreopoulos et al. | |
| 2016/0050888 A1 | 2/2016 | Berckmans et al. | |
| 2016/0086052 A1 | 3/2016 | Piekniewski et al. | |
| 2016/0150758 A1* | 6/2016 | Salem | A01K 29/005 119/421 |
| 2016/0232440 A1* | 8/2016 | Gregor | G06N 3/04 |
| 2017/0124727 A1* | 5/2017 | Amat Roldan | G01B 11/24 |
| 2017/0154241 A1* | 6/2017 | Shambik | G06V 40/103 |
| 2017/0206426 A1 | 7/2017 | Schrier et al. | |

FOREIGN PATENT DOCUMENTS

| | | | | |
|---|---|---|---|---|
| CN | 102077268 A | | 5/2011 | |
| CN | 106845411 A | | 6/2017 | |
| CN | 108064745 A | * | 5/2018 | |
| CN | 108064745 A | | 5/2018 | |
| CN | 108065938 A | * | 5/2018 | |
| CN | 108065938 A | | 5/2018 | |
| CN | 109871911 A | * | 6/2019 | |
| CN | 109871911 A | | 6/2019 | |
| JP | H11296651 A | | 10/1999 | |
| WO | WO-2012143854 A1 | * | 10/2012 | ............. A01K 1/031 |
| WO | 2013170129 A1 | | 11/2013 | |
| WO | WO-2016100138 A1 | * | 6/2016 | ........... F24F 11/0012 |
| WO | WO-2017147442 A1 | * | 8/2017 | ........... A01K 1/0047 |
| WO | WO-2018208319 A1 | * | 11/2018 | ........... A01K 1/0052 |

OTHER PUBLICATIONS

Bogue, M.A., et a., "Mouse Phenome Database: an integrative database and analysis suite for curated empirical phenotype data from laboratory mice, " Nucleic Acids Res, 46, D843-D850 (2018).
Branson, K. et al., "High throughput ethomics in large groups of *Drosophila*." Nature Methods, 6(6), 451-457 (2009).
Branson, K. et al., "Tracking Multiple Mouse Contours (Without Too Many Samples)." 2005 IEEE Computer Society Conference on Computer Vision and Pattern (CVPR'05), Jun. 20-25, San Diego, CA, pp. 1039-1046 (2005).
Decoster, W. et al., "The ageing voice: changes in fundamental frequency, waveform stability and spectrum." Acta Otorhinolaryngol Belg 51, pp. 105-112 (1997).
Deschenes, M. et al., "Sniffing and whisking in rodents." Curr Opin Neurobiol, 22, pp. 243-250 (2012).
Egnor, S.E. et al., "Computational Analysis of Behavior." Annu Rev Neurosci, 39, pp. 217-236 (2016).
Gomez-Marin, A. et al., "Big behavioral data: psychology, ethology and the foundations of neuroscience." Nat Neurosci, 17, pp. 1455-1462 (2014).
Grimsley, J.M. et al., "Development of social vocalizations in mice." PLoS One, 6, e17460, p. 1-15 (2011).
He, K. et al., "Identity Mappings in Deep Residual Networks." European Conference on Computer Vision, pp. 630-645 (2016).
Heckman, J.J. et al., "High-precision spatial localization of mouse vocalizations during social interaction." Sci Rep, 7(7), 3017 (2017).
Kabra, M. et al., "JAABA: interactive machine learning for automatic annotation of animal behavior." Nat. Methods, 10, pp. 64-67 (2013).
Krizhevsky, A. et al., "ImageNet Classification with Deep Convolutional Neural Networks." Advances in neural information processing systems 25 (NIPS 2012).
Kulesskaya, N. et al., "Assessment of mouse anxiety-like behavior in the light-dark box and open-field arena: role off equipment and procedure." Physiol Behav 133, 30-38 (2014).
Kumar, V. et al., "Second-generation high-throughput forward genetic screen in mice to isolate subtle behavioral mutants." Proceedings of the National Academy of Sciences, 108 (Supplement 3), pp. 15557-15564 (2011).
Lecun, Y. et al., "Deep learning." Nature 521, 436-444 (2015).
Martins, R.H. et al., "Aging voice: presbyphonia." Aging Clin Exp Res, 26, pp. 1-5 (2014).
Mueller, P.B. "The aging voice." Semin Speech Lang, 18(2), pp. 159-169 (1997).
Neunuebel, J.P. et al., "Female mice ultrasonically interact with males during courtship displays." Elife, 4:e06203, p. 1-24 (2015).
Ohayon, S. et al., "Automated multi-day tracking of marked mice for the analysis of social behaviour." J. Neurosci. Methods, 219(1), pp. 10-19 (2013).
Shannon, C .E., "Communication in the presence of noise." Proceedings of the IRE, 37(1), pp. 447-457 (1998).
Sobral, A., "BGSLibrary: An OpenCV C++ Background Subtraction Library." in IX Workshop de Visao Computacional (WVC 2013), vol. 27 (2013). Written in Spanish, Also included Google Machine English Translation.
Valdez, P. et al., "Effects of color on emotions." Journal of experimental psychology: General, 123(4), pp. 394-409. (1994).
Wiltschko, A.B. et al., "Mapping Sub-Second Structure in Mouse Behavior," Neuron, 88, pp. 1121-1135 (2015).

(56) References Cited

OTHER PUBLICATIONS

Zhang, C. et al., "Maximum likelihood sound source localization and beamforming for directional microphone arrays in distributed meetings." IEEE Transactions on Multimedia 10, pp. 538-548 (2008).

Zoph, B. et al., "Learning Transferable Architectures for Scalable Image Recognition." arXiv preprint arXiv: 1707.07012, p. 8697-8710 (2017).

International Preliminary Report on Patentability dated Feb. 11, 2020, the Written Opinion and the International Search Report dated Nov. 13, 2018 from corresponding PCT Application No. PCT/US2018/045676.

First Office Action and Search Report from the China Intellectual Property Administration dated Jul. 20, 2021 from corresponding Chinese Patent Application No. 201880064637.3.

Extended European Search Report dated Mar. 30, 2021 from corresponding European Patent Application No. 18843419.5.

Wang, Zirong et al. "Behavior classification and image processing for biorobot-rat interaction." International Conference on Electronics Information and Emergency Communication , Jul. 21, 2017, p. 572-575.

Badrinarayanan, V. et al. "SegNet: A Deep Convolutional Encoder-Decoder Architecture for Image Segmentation." IEEE Transactions on Pattern Analysis and Machine Intelligence, vol. 39. No. 12, Oct. 10, 2016.

Rothe, R. et al. "DEX: Deep Expectation of apparent age from a single image." 2015 IEEE International Conference on Computer Vision Workshop.

Hardy: "General regression neural network." Wikipedia, May 6, 2017, https://en.wikipedia.org/w/index.php?title=General_regression_neural_network&oldid=779041252.

Geuther, Brian, et al. "Robust mouse tracking in complex environments using neural networks." bioRxiv, Jul. 21, 2018, https://www.biorxiv.org/content/10.1101/336685v2.full.pdf.

Kumar, S. et al. "Visual animal biometrics: survey." IET Biom. 2017, vol. 6. Iss. 3, pp. 139-156.

* cited by examiner

Visible Light | Infrared Light

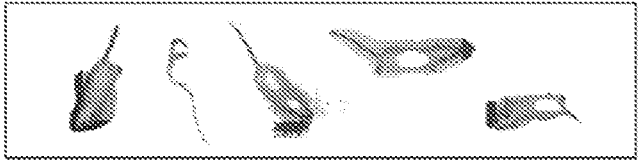
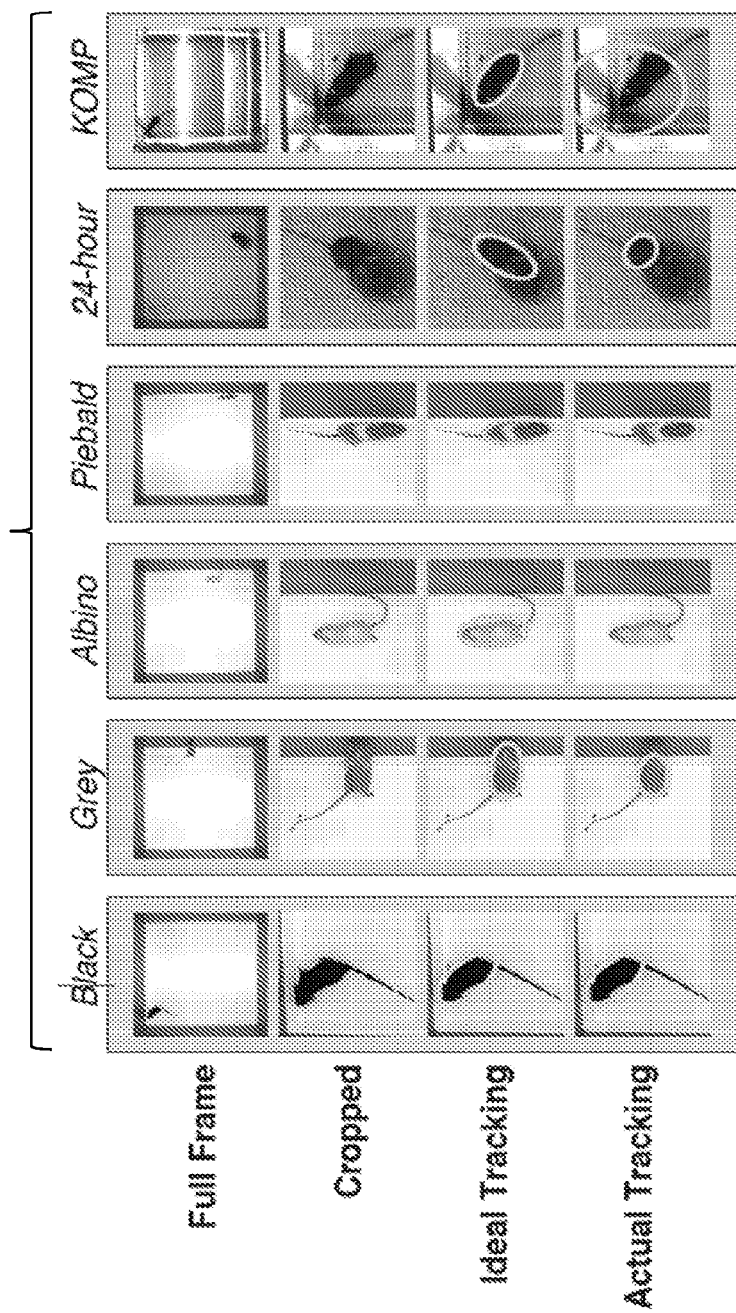

*x-coord, y-coord, major axis, minor axis, angle*

Visible Light

Infrared Light

LONG-TERM AND CONTINUOUS ANIMAL BEHAVIORAL MONITORING

CROSS-REFERENCE TO RELATED APPLICATIONS

This application is a continuation application of U.S. application Ser. No. 16/636,392, filed Feb. 4, 2020, which is a National Stage Filing under 35 U.S.C. § 371 of PCT International Application PCT/US2018/045676, filed Aug. 7, 2018, which claims benefit under 35 U.S.C. § 119(e) of U.S. Provisional Application No. 62/542,180, filed Aug. 7, 2017 and U.S. Provisional Application No. 62/661,610, filed Apr. 23, 2018, content of each of these applications is incorporated by reference herein in its entirety.

BACKGROUND

Animal behavior can be understood as an output of the nervous system in response to internal or external stimuli. The ability to accurately track animals can be valuable as part of a process for classifying their behavior. For example, changes in behavior are a hallmark of aging, mental disorders, or even metabolic diseases, and can reveal important information about the effect of on physiology, neurocognitive, and the emotional state of animals.

SUMMARY

Traditionally, experiments to assess animal behavior have been conducted invasively, where a researcher directly interacts with an animal. As an example, a researcher might remove an animal, such as a mouse, from a home environment (e.g., a cage) and transfer the animal to a different environment (e.g., a maze or other apparatus). The researcher might then position themselves near the new environment and track the animal in order to observe them in performance of a task. However, it has beet recognized that animals may behave differently in the new environment or to the experimenter who is carrying out the test. This often leads to confounds in the data and causes irreproducible and misleading results.

Less invasive monitoring techniques have been developed to minimize human interference during behavioral monitoring experiments. As an example, video monitoring has been explored to use in monitoring animal behavior. However, challenges persist in video monitoring. In one aspect, the ability to capture video data with high temporal and spatial resolution, continuously over long periods, and under a broad set of environmental conditions, remains a key hurdle. Observational studies of animals that take place over long durations, such as multiple days, weeks, and/or months, can generate a large amount of data that is costly to acquire and store. In another aspect, even assuming the ability to acquire and store video data of sufficient quality, it is not economically feasible for human researchers to manually review the age amount of video footage generated during long duration observation and track animals over such long durations. This challenge is magnified when the number of animals under observation increases, as can be necessary when screening for novel drugs or conducting genomics experiments.

To address this issue computer-based techniques have been developed to analyze captured video of animal behavior. However, existing computer-based systems lack the ability to accurately track different animals in complex and dynamic environments. In one example, existing computer-based techniques for animal tracking can fail to accurately distinguish a single animal from a background (e.g., cage walls and/or floors objects within a cage such water bowls) or multiple animals from one another. At best, if a given animal is not accurately tracked during an observation period, then valuable observation data can be lost. At worst, if a given animal or portion of that animal is incorrectly tracked and mistaken for another during an observation period, error can be introduced into behavior classified from the acquired video data. While techniques such as changing an animal's coat color have been employed to facilitate tracking, changing an animal's coat coloring can alter its behavior. As a result, existing video tracking approaches carried out in complex and dynamic environments or with genetically heterogeneous animals require a high level of user involvement, negating the above-discussed advantages of video observation. Thus, large scale and/or long term animal monitoring experiments remain unfeasible.

As neuroscience and behavior moves into an era of big behavioral data and computational ethology, better techniques are necessary for animal tracking to facilitate behavior classification of animals in semi-natural and dynamic environments over long periods of time.

Accordingly, systems and methods capable of providing robust and scalable tracking of animals (e.g., mice) in an open field have been developed that employ neaul networks. As an example, systems and methods are provided to facilitate acquisition of video data of animal movements with high temporal and spatial resolution. This video data can be captured in a continuous manner over long periods and under a broad set of environmental conditions.

The acquired video data can be employed as input to convolutional neural network architectures for tracking. The neural network can be trained such that, when a new environment or animal is presented, the When trained, the neural network is highly robust and capable of tracking under multiple experimental conditions without user-involved tuning. Examples of such experimental conditions can include different strains of mice, regardless of various coat colors, body shapes, and behaviors, as well as different caging environments. Thus, embodiments of the present disclosure can facilitate minimally invasive animal tracking to facilitate behavior monitoring of large numbers of animals over long durations under disparate conditions.

In certain embodiments, the disclosed video observation and animal tracking techniques can be employed in combination. However, it can be understood that each of these techniques can be employed alone or in ay combination with each other or other techniques.

In an embodiment, a method for animal tracking is provided. The method can include receiving, by a processor, video data representing observation of an animal, and executing, by the processor, a neural network architecture. The neural network architecture can be configured to receive an input video fame extracted from the video data, to generate an ellipse description of at least one animal based upon the input video fame, the ellipse description being defined by predetermined ellipse parameters, and to provide data including values characterizing the predetermined ellipse parameter for the at least one animal.

In another embodiment of the method, the ellipse parameters can be coordinates representing a location of the animal within a plane, major axis length and a minor axis length of the animal, and an angle at which the animal's head is facing, the angle being defined with respect to the direction of the major axis.

In another embodiment of the method, the neural network architecture can be an encoder-decoder segmentation network. The encoder-decoder segmentation network can be configured to predict a foreground-background segmented image from an input video frame, to predict, on a pixel-wise basis, whether an animal is present in the input video frame based upon the segmented image, output a segmentation mask based upon the pixel-wise prediction, and to fit the portions of the segmentation mask where the animal ii predicted to be present to an ellipse to determine the values characterizing the predetermined ellipse parameters.

In another embodiment of the method, the encoder-decoder segmentation network can include a feature encoder, a feature decoder, and an angle predictor. The feature encoder can be configured to abstract the input video frame into a small spatial resolution set of features. The feature decoder can be configured to convert the set of features into the same shape as the input video frame and to output the foreground-background segmented image. The angle predictor can be configured to predict an angle at which the animal's head is facing.

In another embodiment of the method, the neural network architecture can include a binned classification network configured predict a heat map of a most probable value for each ellipse parameter of the ellipse description.

In another embodiment of the method, the binned classification network can include a feature encoder configured to abstract the input video frame into a small spatial resolution, where the abstraction is employed to generate the heat map.

In another embodiment of the method, the neural network architecture can include a regression network configured to extract features rom an input video frame and directly predict the values characterizing each of the ellipse parameters.

In another embodiment of the method, the animal can be a rodent.

In an embodiment, a system for animal tracking is provided. The system can include an data storage device maintaining video data representing observation of an animal. The system can also include a processor configured to receive video data in the data storage device and to implement a neural network architecture. The neural network architecture can be configured to receive an input video frame extracted from the video data, to generate an ellipse description of at least one animal based upon the video frame, the ellipse description being defined by predetermined ellipse parameters, and to provide data including values characterizing the predetermined ellipse parameters for the at least one animal.

In another embodiment of the system the ellipse parameters can be coordinates representing a location of the animal within a plane, major axis length and a minor axis length of the animal, and an angle at which the animal's head is facing, the angle being defined with respect to the direction of the major axis.

In another embodiment of the system the neural network architecture can be an encoder-decoder segmentation network. The encoder-decoder segmentation network can be configured to predict a foreground-background segmented image from an input video frame, to predict, on a pixel-wise basis, whether an animal is present in the input video fame based upon the segmented image, to output a segmentation mask based upon the pixel-wise prediction, and to fit the portions of the segmentation mask where the animal is predicted to be present to an ellipse to determine the values characterizing the predetermined ellipse parameters.

In another embodiment of the system, the encoder-decoder segmentation network can include a feature encoder, a feature decoder, and an angle predictor. The feature encoder can be configured to abstract the input video frame into a small spatial resolution set of features. The feature decoder can be configured to convert the set of features into the same shape as the input video frame and to output the foreground-background segmented image. The angle predictor can be configured to predict an angle at which the animal's head is facing.

In another embodiment of the system, the neural network architecture can include a binned classification network. The binned classification network can be configured predict a heat map of a most probable value for each ellipse parameter of the ellipse description.

In another embodiment of the system, the binned classification network can include a feature encoder configured to abstract the input video frame into a small spatial resolution, where the abstraction is employed to generate the heat map.

In another embodiment of the system, the neural network architecture can include a regression network configured to extract features from an input video frame and directly predict the values characterizing each of the ellipse parameters.

In another embodiment of the system, the animal can be a rodent.

In an embodiment, a non-transitory computer program product storing instructions is provided. The instruction, when executed by at least one data processor of at least one computing system, can implement a method including receiving video data representing observation of an animal, and executing a neural network architecture. The neural network architecture can be configured to receive an input video frame extracted from the video data, to generate an ellipse description of at least e animal based upon the input video frame, the ellipse description being defined by predetermined ellipse parameters, and to provide data including values characterizing the predetermined ellipse parameters for the at least one animal.

In another embodiment, the ellipse parameters can be coordinates representing a location of the animal within a plane, major axis length and a minor axis length of the animal, and an angle at which the animal's head is facing, the angle being defined with respect to the direction of the major axis.

In another embodiment, the neural network architecture can be an encoder-decoder segmentation network. The encoder-decoder segmentation network can be configured to predict a foreground-background segmented image from an input video frame, to predict, on a pixel-wise basis, whether an animal is present in the input video frame based upon the segmented image; to output a segmentation mask based upon the pixel-wise prediction, and to fit the portions of the segmentation mask where the animal is predicted to be present to an ellipse to determine the values characterizing the predetermined ellipse parameters.

In another embodiment, the encoder-decoder segmentation network can include a feature encoder, a feature decoder, and an angle predictor. The feature encoder can be configured to abstract the input video frame into a small spatial resolution set of features. The feature decoder can be configured to convert the set of features into the same shape as the input video frame and to output the foreground-background segmented image. The angle predictor can be configured to predict an angle at which the animal's head is facing.

In another embodiment, the neural network architecture can include a binned classification network configured predict a heat map of a most probable value for each ellipse parameter of the ellipse description.

In another embodiment, the binned classification network can include a feature encoder configured to abstract the input video frame into a small spatial resolution, where the abstraction can be employed to generate the heat map.

In another embodiment, the neural network architecture can include a regression network configured to extract features from an input video frame and directly predict the values characterizing each of the ellipse parameters.

In another embodiment, the animal can be a rodent.

In an embodiment, a system is provided an it can include an arena and an acquisition system. The arena can include a frame and an enclosure mounted to the frame. The enclosure can be dimensioned to house an animal and it can include a door configured permit access to an interior of the enclosure. The acquisition system can include a camera, at least two sets of light sources, a controller, and a data storage device. Each of the sets of light sources can be configured to emit light a wavelength different from the other and emit light incident upon the enclosure. The camera can be configured to acquire video data of at least a portion of the enclosure when illuminated by at least one of the sets of light sources. The controller can be electrical communication with the camera and the sets of light sources. The controller can be configured to generate control signals operative to control acquisition of video data by the camera and emission of light by the sets of light sources and to receive video data acquired by the camera. The data storage device can be in electrical communication with the controller and it can be configured to store video data received from the controller.

In another embodiment of the system, at least a portion of the enclosure can be approximately opaque to visible light.

In another embodiment of the system, at least a portion of the enclosure can be formed from a material that is approximately opaque to visible light wavelengths.

In another embodiment of the system, at least a portion of the enclosure can be formed from a material that is approximately non-reflective to infrared light wavelengths.

In another embodiment of the system, at least a portion of the enclosure can be firmed from sheets of polyvinyl chloride (PVC) or polyoxymethylene (POM).

In another embodiment of the system, a first set of light sources can include one or more first lights configured to emit light at one or mom visible light wavelengths and a second set of light source can include one or more second lights configured to emit light at one or more infrared (IR) light wavelengths.

In another embodiment of the system, the wavelength of infrared light can be approximately 940 nm.

In another embodiment of the system, the camera can be configured to acquire video data at a resolution of at least 480×480 pixels.

In another embodiment of the system, the camera can be configured to acquire video data at a frame rate grater than a frequency of mouse movement.

In another embodiment of the system, the camera can be configured to acquire video data frame rate of at least 29 frames per second (fps).

In another embodiment of the system, the camera can be configured to acquire video data possessing at least 8-bit depth.

In another embodiment of the system, the camera can be configured to acquire video data at infrared wavelengths.

In another embodiment of the system, the controller can be configured to compress video data received from the camera.

In another embodiment of the system, the controller can be configured to compress video data received rom the camera using an MPEG4 codec with a filter employing variance-based background subtraction.

In another embodiment of the system, the MPEG codec filter can be Q0 HQDN3D.

In another embodiment of the system, the controller can be configured to command the first light source to illuminate the enclosure according to a schedule that simulates a light/dark cycle.

In another embodiment of the system, the controller can be configured to command the first light source to illuminate the enclosure with visible light possessing an intensity of about 50 lux to about 800 lux during the light portion of the light/dark cycle.

In another embodiment of the system, the controller can be configured to command the second light source to illuminate the enclosure with infrared light such that a temperature of the enclosure is raised by less than 5° C. by the infrared illumination.

In another embodiment of the system, the controller can be configured to command the first light source to illuminate the enclosure according to 1024 levels of lighting scaled logarithmically.

In an embodiment, a method is provided and it can include illuminating, by at least one set of light sources, an enclosure configured to house an animal. Each set of light sources can be configured to emit light a wavelength different from the other. The method can also include acquiring, by a camera, video data of at least a portion of the enclosure that is illuminated by at least one of the sets of light sources. The method can additionally include generating, by a controller in electrical communication with the camera and the sets of light sources control signals operative to control acquisition of video data by the camera and emission of light by the sets of light sources. The method can further include receiving, by the controller, video data acquired by the camera.

In another embodiment of the method, at least a portion of the enclosure can be approximately opaque to visible light.

In another embodiment of the method, at least a portion of the enclosure can be formed from a material that is approximately opaque to visible light wavelengths.

In another embodiment of the method, at least a portion of the enclosure can be formed from a material that is approximately non-reflective to infrared light wavelengths.

In another embodiment of the method, at least a portion of the enclosure can be formed from sheets of polyvinyl chloride (PVC) or polyoxymethylene (POM).

In another embodiment of the method, a first set of light sources can include one or more first lights configured to emit light at one or more visible light wavelengths and a second set of light source can include one or more second lights configured to emit light at one or more infrared (IR) light wavelengths.

In another embodiment of the method, the wavelength of infrared light can be approximately 940 nm.

In another embodiment of the method, the camera can be configured to acquire video data at a resolution of at least 480×480 pixels.

In another embodiment of the method, the camera can be configured to acquire video data at a frame rate greater than a frequency of mouse movement.

In another embodiment of the method, the camera can be configured to acquire video data a frame rate of at least 29 frames per second (fps).

In another embodiment of the method, the camera can be configured to acquire video data possessing at least 8-bit depth.

In another embodiment of the method, the camera can be configured to acquire video data at infrared wavelengths.

In another embodiment of the method, the controller can be configured to compress video data received from the camera.

In another embodiment of the method, the controller can be configured to compress video data received from the camera using an MPEG4 codec with a filter employing variance-based background subtraction.

In another embodiment of the method, the MPEG codec filter can be Q0 HQDN3D.

In another embodiment of the method, the controller can be configured to command the first light source to illuminate the enclosure according to a schedule that simulates a light/dark cycle.

In another embodiment of the method, the controller can be configured to command the first light source to illuminate the enclosure with visible light possessing an intensity of about 50 lux to about 800 lux during the light portion of the light/dark cycle.

In another embodiment of the method, the controller can be configured to command the second light source to illuminate the enclosure with infrared light such that a temperature of the enclosure is raised by less than 5° C. by the infrared illumination.

In another embodiment of the method, the controller can be configured to command the first light source to illuminate the enclosure according to 1024 levels of lighting scaled logarithmically.

BRIEF DESCRIPTION OF THE DRAWINGS

These and other features will be more readily understood from the following detailed description taken in conjunction with the accompanying drawings, in which:

FIG. 8A is a schematic illustration of exemplary embodiments of observation environments analyzed according to the present disclosure, including black mice, grey mice, albino mice, and piebald mice.

FIG. 8B is a schematic illustration of conditions giving rise to poor animal tracking;

It is noted that the drawings are not necessarily to scale. The drawings are intended to depict only typical aspects of the subject matter disclosed herein, and therefore should not be considered as limiting the scope of the disclosure.

DETAILED DESCRIPTION

For clarity, exemplary embodiments of systems and corresponding methods for video capture of one or more animals and tracking of one or more animals to facilitate behavior monitoring are discussed herein in the context of small rodents, such as mice. However, the disclosed embodiments can be employed and/or adapted for monitoring other animals without limit.

Figure 1:
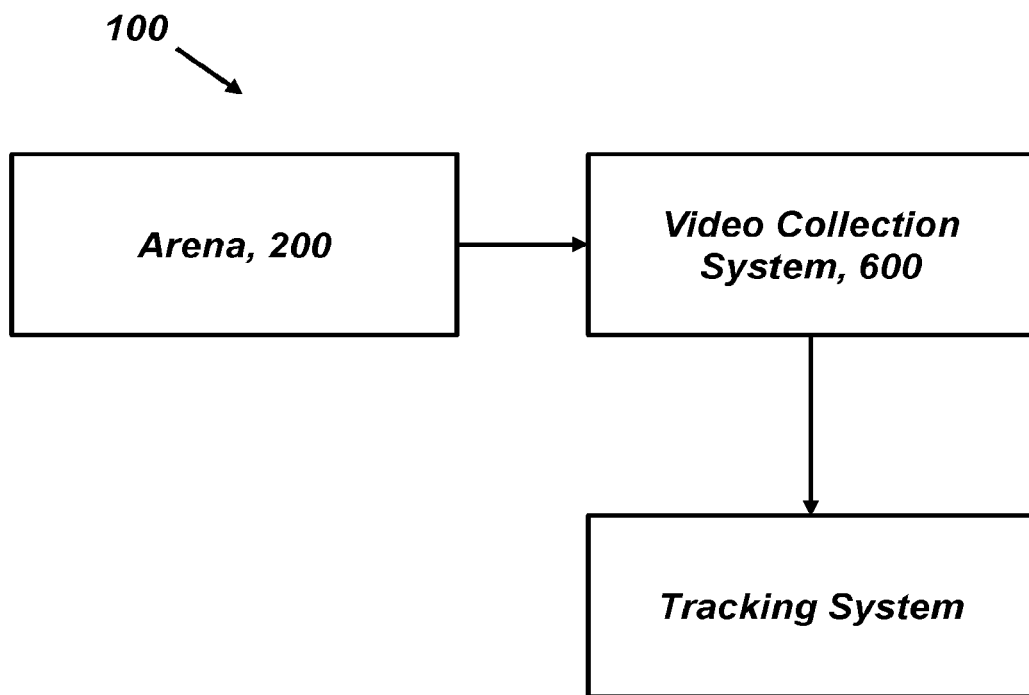
FIG. 1 is a flow diagram illustrating one exemplary embodiment of an operating environment for animal tracking.

FIG. 1 is a schematic diagram illustrating one exemplary embodiment of an operating environment 100 including an arena 200, an acquisition system 700, and a tracking system configured to implement a neural network tracker. As discussed in greater detail below, one or more mice can be housed in the arena 200. Video data of at least one animal, such a mouse, is acquired. Video data can be acquired alone or in combination with other data pertinent to animal monitoring, such as audio and environmental parameters (e.g., temperature, humidity, light intensity, etc.). The process of acquiring this data, such as control of cameras, microphones, lighting, other environmental sensors, data storage, and data compression, can be performed by the acquisition system 700. Acquired video data can be input to the tracking system which can execute a convolutional neural network (CNN) for tracking one or more animals based upon the video data.

I. Video Data Acquisition

In an embodiment, systems and methods are provided for capture of video data including movement of animals. As discussed below, the video data can be acquired continuously over a predetermined time period (e.g., one or more minutes, hours, days, weeks, months, years, etc.). Characteristics of the video data, including but not limited to one or more of resolution, frame rate, and bit depth, can be sufficient to facilitate subsequent analysis for extraction of behavioral patterns. A working solution has been provided and is shown to be robust and higher quality than existing video capture systems. Embodiments of the present disclosure are tested in several methods of visibly marking mice. Working examples of synchronized acquisition of video and ultra-sonic vocalization data are also presented.

In an embodiment, a video monitoring system can be deployed for animal monitoring in a time period of about 4-6 weeks. Deployment can include one or more of image capture and arena design, chamber design refinement, development of video acquisition software, and acquisition of audio data, stress test of cameras, chamber and software, and decision on production of chambers for deployment phase. Each of these is described in detail below. It can be understood that the above-referenced observation perior of 4-6 weeks is provided for example purposes and that embodiments of the disclosure can be employed for longer or shorter time periods, as necessary.

a. Arena Design

Proper area design can be important for acquisition of high quality behavior data. This arena is the "home" of the animals and it can be configured to provide one or more of insulation from environmental disturbances, proper circadian lighting, food, water, bedding, and generally is a stress free environment.

From a behavior perspective, it can be desirable for the area to minimize stress and environmental disturbances and allow natural behavior to be expressed.

From a husbandry perspective, it can be desirable for the arena to facilitate cleaning, addition or removal and remove mice, add and remove food and water.

From a veterinary perspective, it can be desirable for the area to facilitate health checks and provision of medical treatment, as well as monitoring environmental conditions (e.g., temperature, humidity, light, etc.) without substantially disturbing the behavior of interest.

From a computer vision perspective, it can be desirable for the arena to facilitate the acquisition of high quality video and audio, without substantial occlusions, distortions, reflections, and/or noise pollution and without substantially interfering with the expression of the behaviors of interest.

From a facilities perspective, it can be desirable for the arena to substantially minimize floor footprint and provide relatively easy storage without the need for dismantling or reassembly.

Figure 2:
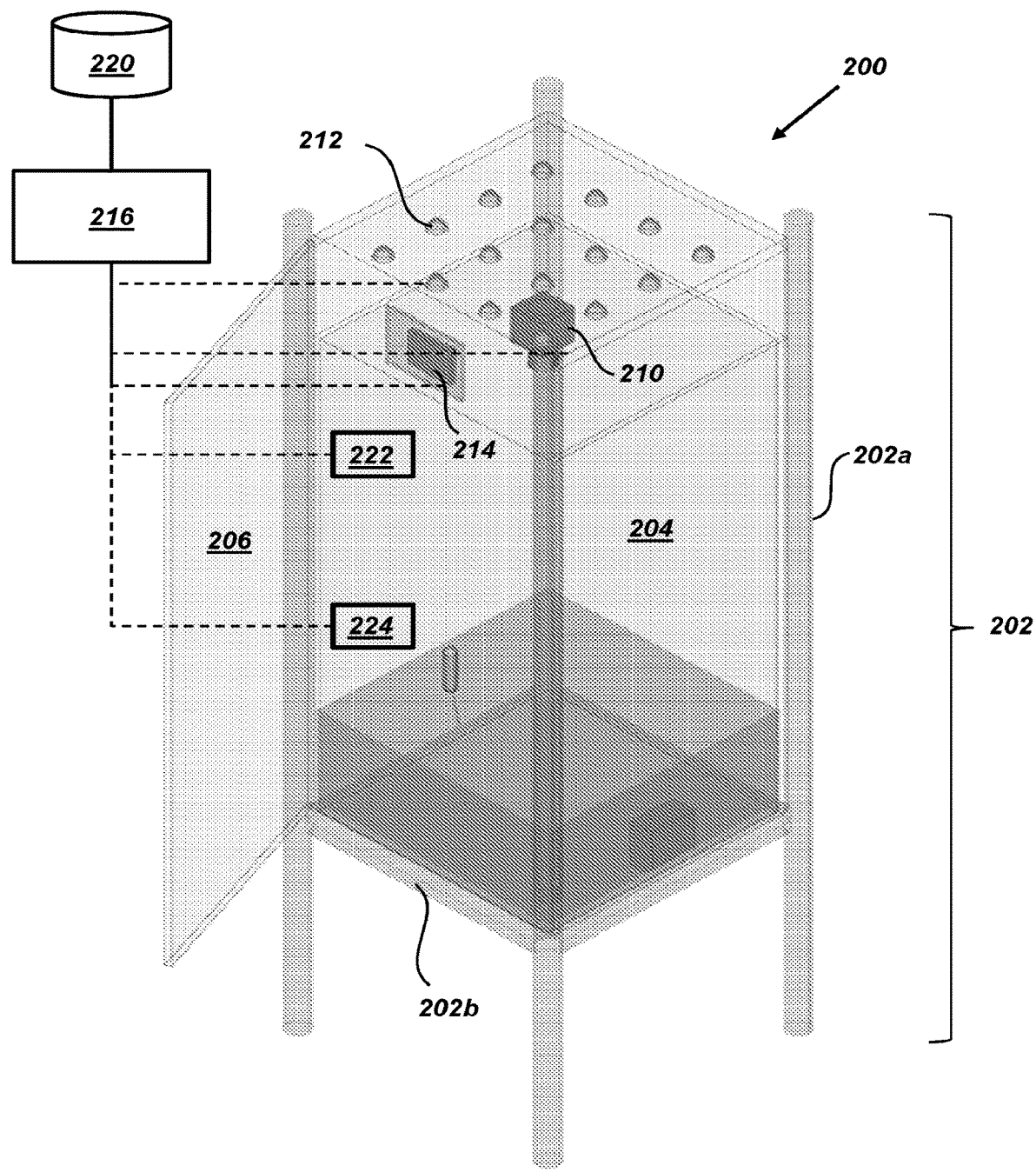
FIG. 2 is a schematic illustration of an embodiment of a system for animal behavioral monitoring.

Accordingly, the arena can be configured to provide a balance of behavior, husbandry, computational, and facilities. One exemplary embodiment of an arena 200 is illustrated in FIG. 2. The arena 200 can include a frame 202 upon which an enclosure 204 is mounted. The enclosure can include a door 206 configured to permit access to an interior of the enclosure 204. One or more cameras 210 and/or lights 212 can be mounted adjacent to or directly to the frame 202 (e.g., above the enclosure 204).

As discussed in detail below, in certain embodiments, the lights 212 can include at least two sets of light sources. Each set of light sources can include one or more lights configured to emit light at a different wavelength from the other set and incident upon the enclosure 204. As an example, a first set of light sources can be configured to emit light at one or mom visible wavelengths (e.g., from about 390 nm to about 700 nm) and a second set of light sources can be configured to emit light at one or more infrared (IR) wavelengths (e.g., from about greater than 700 nm to about 1 mm).

The camera 210 and/or lights 212 can be in electrical communication with a user interface 214. The user interface 214 can be be a display configured to view video data acquired by the camera 210. In certain embodiments, the user interface 214 can be a touch-screen display configured to display one or more user interfaces for control of the camera 210 and/or the lights 212.

Alternatively or additionally, the camera 210, lights 212, and user interface 214 can be in electrical communication with a controller 216. The controller 216 can be configured to generate control signals operative to control acquisition of video data by the camera 210, emission of light by the lights 212, and/or display of acquired video data by the user interface 214. In certain embodiments, the user interface can optionally be omitted.

The contoller 216 can also be in communication with a data storage device 220. The controller 216 can be configured to receive video data acquired by the camera 210 and transmit the acquired video data to the data storage device 220 for storage. Communication between one or more of the camera 210, lights 212, user interface 214, controller 216, and data storage device 220 can be performed using wired communication links, wireless communication links, and combinations thereof.

As discussed below, the arena 200 can have an open field design that is configured to achieve a desired balance of behavior, husbandry, computational, and facilities, while also permitting completion in a pre-determined time period (e.g., about 5-months).

Materials

In certain embodiments, at least a portion of the material forming the enclosure 204 (e.g., a lower portion of the enclosure 204) can be substantially opaque to visible light wavelengths. In this manner, visible light emitted by light sources other than lights 212, as well as visual cues (e.g., motion of objects and/or users) observable by animals within the enclosure 204 can be reduced and or approximately eliminated. In additional embodiments, the material forming the enclosure 204 can be approximately non-reflective to infrared wavelengths facilitate acquisition of video data. The thickness of the walls of the enclosure 204 can be selected within a range suitable to provide mechanical support (e.g., from about ⅛ inch to about ¼ inch).

In an embodiment, the enclosure 204 can be built using foam sheets formed from polyvinyl chloride (PVC) or polyoxymethylene (POM). An example of POM is Delrin® (DuPont, Wilmington Del., USA). Beneficially, such foam sheets can impart sufficient versatility and durability to the arena 200 for long-term animal monitoring.

In an embodiment, the frame 202 can include legs 202a and one or more shelves 202b extending therebetween (e.g., horizontally). As an example, the fame 202 can be a commercial shelving system of pre-determined size with locking wheels for moving to storage areas. In one embodiment, the predetermined size can be about 2 feet by 2 feet by 6 feet (e.g., Super Erecta Metroseal 3™, InterMetro Industries Corporation, Wilkes-Barre, Pa., USA). However, in other embodiments, arenas of different sizes can be employed without limit.

b. Data Acquisition

A video acquisition system can include the camera 210, lights 212, user interface 214, controller 216, and data storage device 220. The video acquisition system can be employed having a pre-determined balance of performance characteristics, including but rot limited to, one or more of frame rate of video acquisition, bit depth, resolution of each frame, and spectral sensitivity in the infrared range, as well as video compression and storage. As discussed below, these parameters can be optimized in order to maximize quality and minimize quantity of data.

Figure 3A:
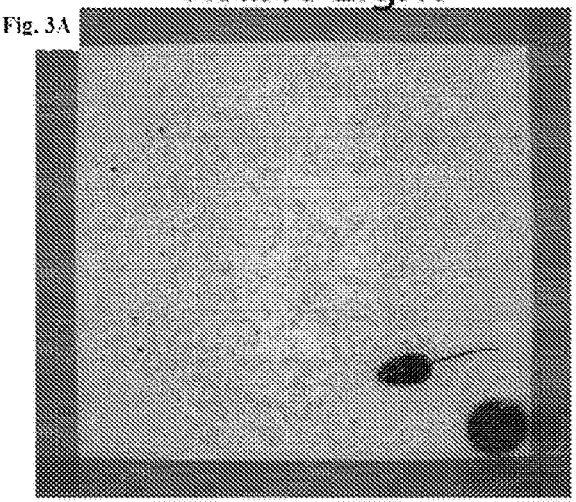
FIGS. 3A-3F are images illustrating sample fames acquired by the system of FIG. 2; (A-C) visible light; (D-F) infrared (IR) light.
Figure 3D:
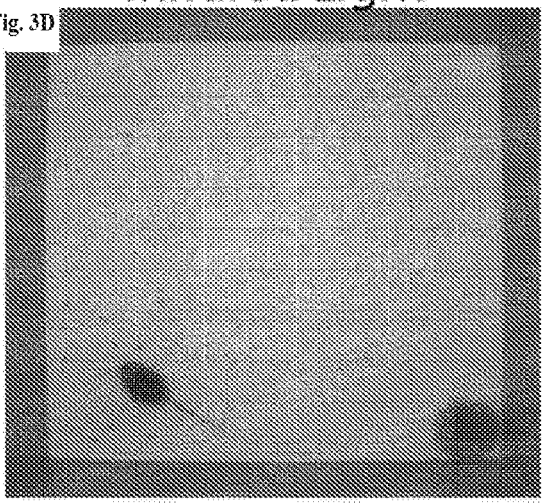
Figure 3B:
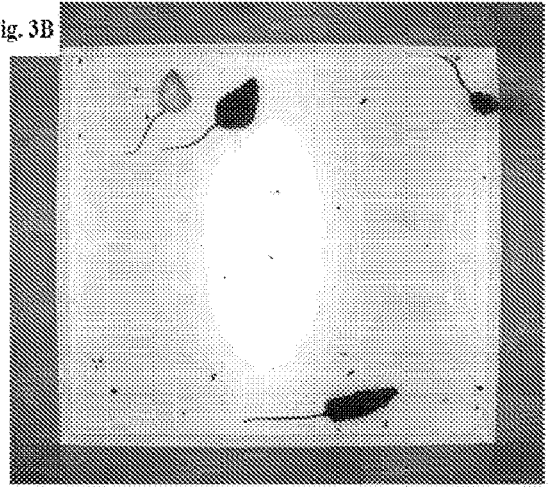
Figure 3E:
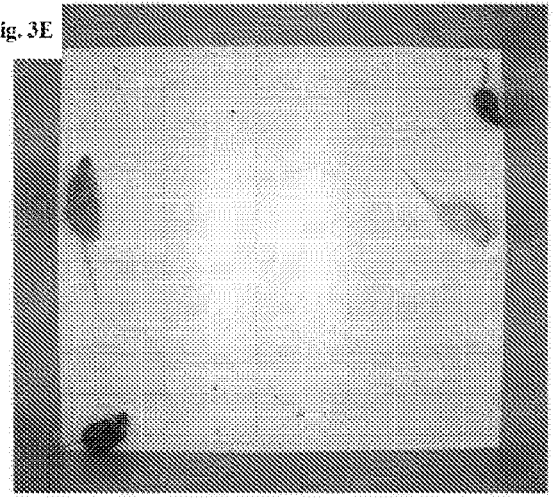
Figure 3C:
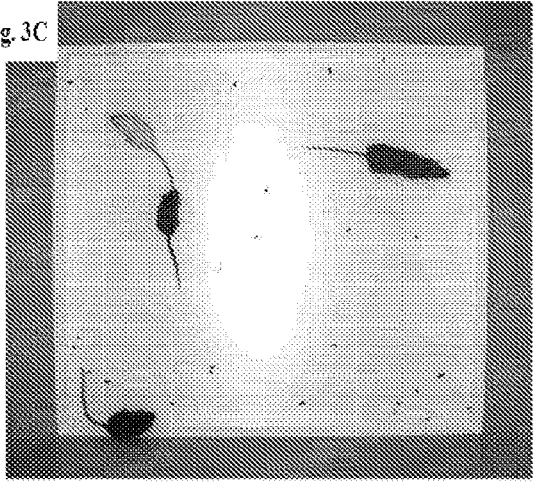
Figure 3F:
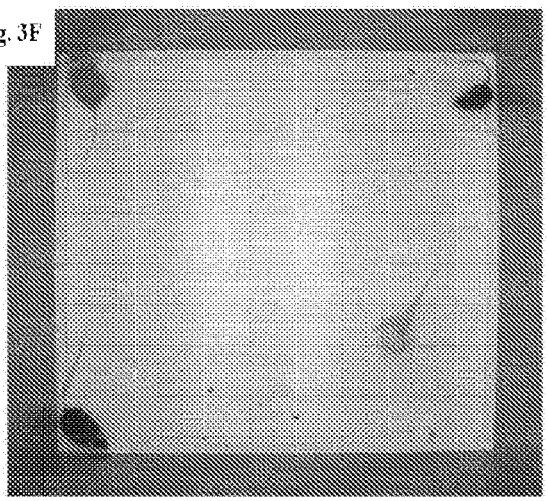

In one embodiment, the camera 210 can acquire vide data possessing at least one-of the following: about 640×480 pixel resolution, about 29 fps, and about 8 bit depth. Using these video acquisition parameters, about 33 GB/hr. of uncompressed video data can be generated. As an example, the camera 210 can be a Sentech USB2 camera (Sensor Technologies America, Inc., Carrollton, TX, USA). FIGS. 3A-3F illustrate sample frames acquired from an embodiment of the video acquisition system using visible light (FIGS. 3A-3C) and infrared (IR) light (FIGS. 3D-3F).

The collected video data can be compressed by the camera 210 and/or the controller 216, as discussed below.

In another embodiment, the video acquisition system can be configured to approximately double the resolution of acquired video data (e.g., to about 960×960 pixels). Four (4) additional cameras having higher resolution than the Sentech USB were investigated, as shown below.

TABLE 1

Exemplary Cameras and Selected Properties

| Camera | Interface | Resolution | Max Frame Rate | Max Bit Depth | Shutter | Quantum Efficiency @ 940 nm | Uncompressed Data |
|---|---|---|---|---|---|---|---|
| Sentech STC-MB22USB | USB3 | 640 × 480 | 60 | 12 | Global | 6% | 9.2 MB/s @30 fps 8 bit |
| Basler ncA1300-60gm-NIR | GigE | 1280 × 1024 | 60 | 10 | Global | 21% | 39.3 MB/s @30 fps, 8 bit |
| Raspberry Pi NoIR V2 | Serial | 1280 × 720 1640 × 1232 | 90 30 | 8 | Global | NA | H264 Lossy Compressed, Max 3.1 MB/s |
| PtGrey BFLY-U3-23S6M-C | USB3 | 1920 × 1200 | 41 | 12 | Global | 5% | 69.1 MB/s @30 fps, 8 bit |
| Basler daA1600-60um | USB3 | 1600 × 1200 | 60 | 12 | Global | 7% | 57.6 MB/s @30 fps, 8 bit |

These cameras can vary in cost, resolution, maximum frame rate, bit depth, and quantum efficiency.

Embodiments of the video acquisition system can be configured to collect video data in monochrome, at about 30 fps, and about 8 bit depth. According to the Shannon-Nyquist theorem, the frame rate should be at least twice the frequency of the event of interest (See, e.g., Shannon, 1949). Mouse behavior can vary from a few Hertz for syntax of grooming to 20 Hertz for whisking (See, e.g., Dechenes et al., 2012; Kalueff et. al.., 2010; Willschko et al., 2015). Grooming has been observed occurring up to about 7 Hz and, accordingly, recording videos at a frame rate greater than the frequency of mouse movement (e.g., about 29 fps) is considered to be adequate to observe most mouse behaviors. However, cameras can lose sensitivity rapidly in the IR range. While this loss of contrast can be overcome by increasing the levels of IR light, increasing intensity of IR light can lead to an increase in environmental temperature.

Lighting

As noted above, the lights 212 can be configured to emit one or more types of light, such as visible white light and infrared light. The visible lights can be employed for illumination and programmed (e.g., by the controller 216) to provide a light/dark cycle and adjustable intensity. The ability to regulate light cycles allows simulation of light from the sun that an animal encounters in the wild. The length of light and dark periods can be adjusted to simulate seasons and light shifts can be carried out to simulate jet lag (circadian phase advance and delay) experiments. Additionally, highlight can be employed induce anxiety in certain animals and low light can be employed to elicit different exploratory behavior. Thus the ability to temporally control light/dark length as well as the light intensity is critical for proper behavioral experiment.

In certain embodiments, the controller 216 can be configured to command the visible light sources to illuminate the enclosure 204 with visible light possessing an intensity of about 50 lux to about 800 lux during the light portion of the fight/dark cycle. The selected light intensity ca vary depending upon a type of activity to be observed. In one aspect, a relatively low intensity (e.g., from about 200 lux to about 300 lux) can be employed to encourage exploration activity by a mouse for observation.

In certain embodiments, approximately all video data can be acquired by the camera 210 in the IR range using an R long pass filter. The IR long pass filter can remove approximately all visible light input to the camera 210. Beneficially, IR light can provide uniform lighting of the enclosure 104 regardless of day or night time.

Two wavelengths of IR light have been evaluated, 850 nm and 940 nm LED. The 850 nm lights can exhibit a clear red hue that is visible to the naked eye and can lead to a low light exposure to the animals. However, such dim lights can lead to mood alterations in mice. Therefore, 940 nm light is selected for recording.

Recording in 940 nm wavelength can have a very low quantum yield in cameras, which can manifest as images that appear grainy due to high gain. Accordingly, various infrared lighting levels using different cameras were evaluated to identify the maximum light levels that could be obtained without substantially raising the temperature of the enclosure 204 due to the infrared illumination. In certain embodiments, the temperature of the enclosure 204 can be increased by less than or equal to about 5° C. (e.g., les than or equal to about 3° C.).

Figure 4A:
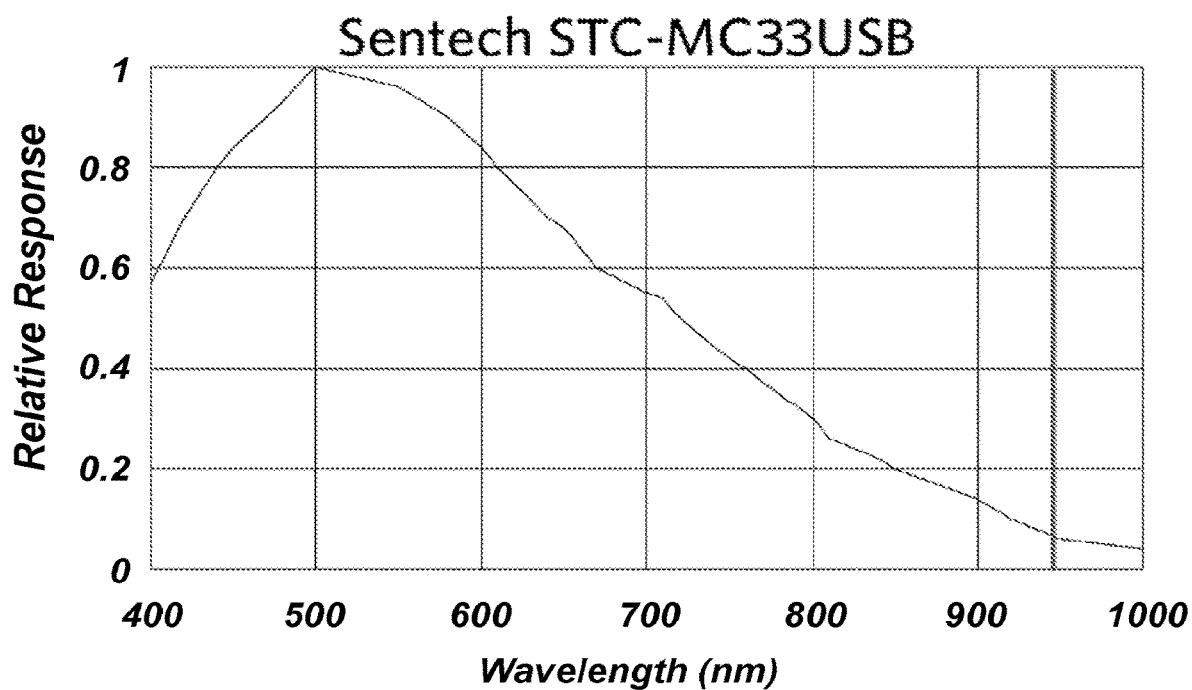
FIGS. 4A-4B are plots of quantum efficiency as a function of wavelength for two camera models; (A) Relative response for Sentech STC-MC33USB; (B) Quantum Efficiency of Basler acA1300-60 gm-NIR.
Figure 4B:
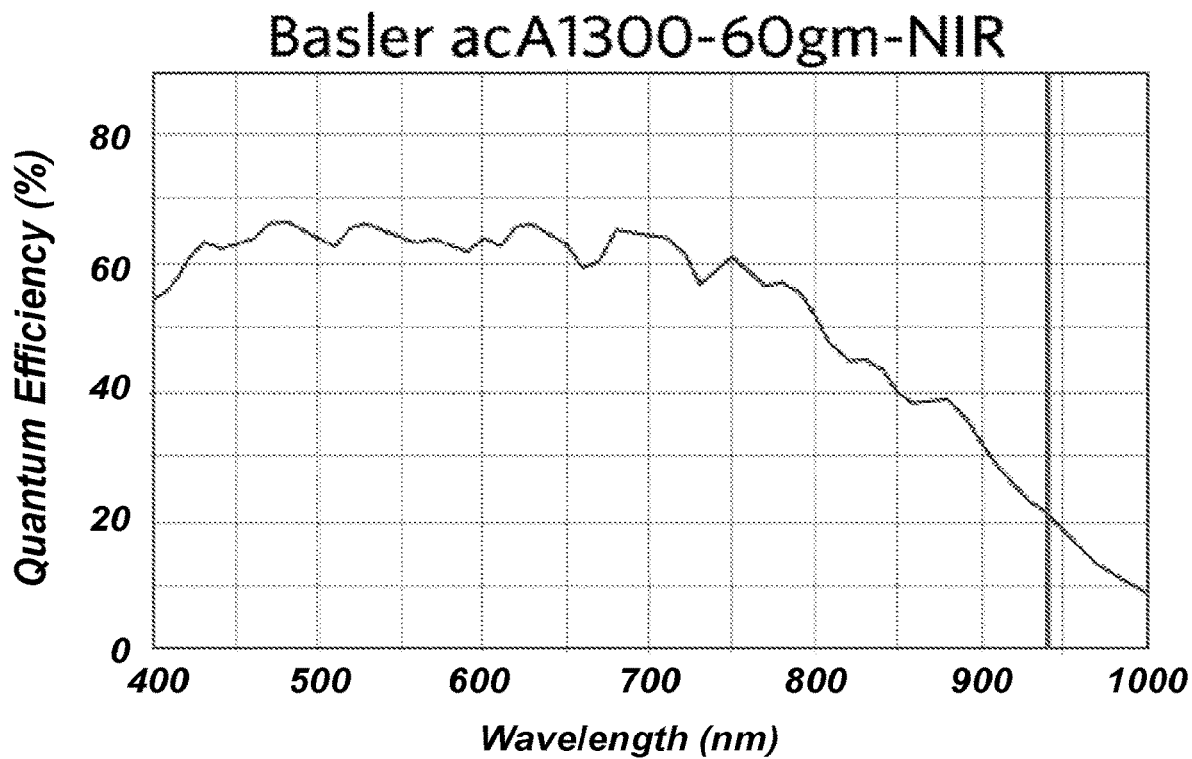

In addition, a Basler acA1300-60gm-NIR camera has been evaluated. This camera, has approximately 3-4 times the spectral sensitivity at 940 nm compared to other cameras listed in Table 1, as illustrated in FIGS. 4A-4B. FIG. 4A illustrates the spectral sensitivity of the Sentech camera as a representative example in terms of relative response and FIG. 4B illustrates the spectral sensitivity of the Basler camera in terms of quantum efficiency. Quantum efficiency is a measure of electrons released as compared to photons striking a sensor. Relative response is the quantum efficiency represented on a scale from 0 to 1. The 940 nm wavelength is further illustrated as a vertical line in FIGS. 4A-4B for reference.

The visible light cycle provided by the lights 212 can be controlled by the controller 216 or another device in communication with the lights 212. In certain embodiments, the controller 216 can include a light control board (Phenome Technologies, Skokie, IL). The board has 1024 levels of lighting scaled logarithmically that can be controlled via an RS485 interface and it can be capable of dawn/dusk events. As discussed in greater detail below, control of the visible light can be integrated into control software executed by the controller 216.

Filters

As noted above, optionally, in order to block approximately all visible light from reaching the camera 210 during video data acquisition, IR long-pass filters can be employed. As an example, a physical IR long-pass filter can be employed with the camera(s) 210. This configuration can provide substantially uniform lighting regardless of light or dark phases in the arena 200.

Figure 5:
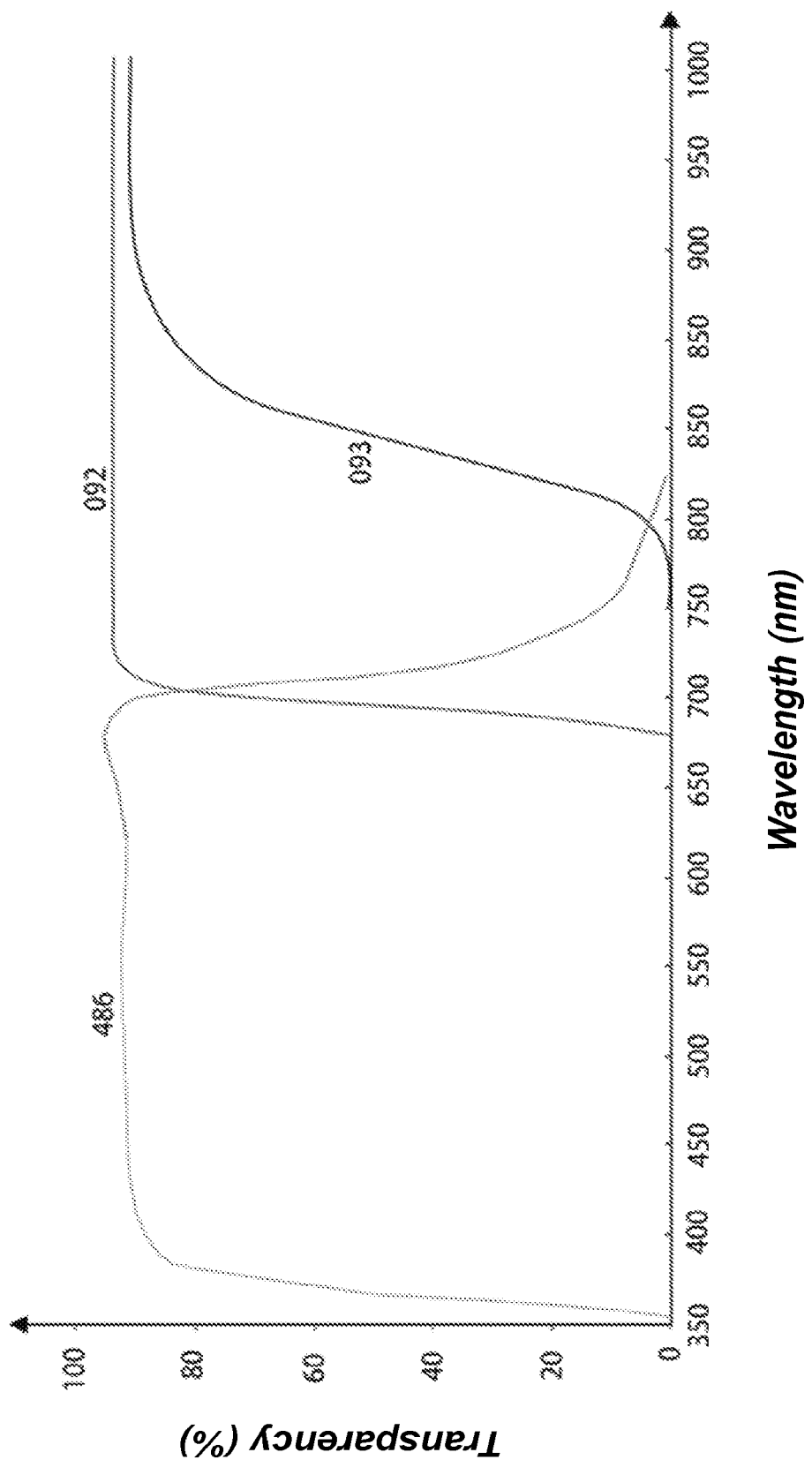
FIG. 5 is a plot of transparency-wavelength profiles for IR long-pass filters.

Filter profiles potentially suitable for use in embodiments of the disclosed systems and methods are shown in FIG. 5 (e.g. IR pass filter 092 and 093). IR-Cut filter 486, which blocks IR light, is shown for comparison. Additional profiles for RG-850 (glass, Edmunds Optics), and 43-949 (plastic, laser cutable, Edmunds Optics) may also be suitable.

Lens

In an embodiment, the camera lens can be a ⅓" 3.5-8 mm f1.4 (CS Mount). This lens can produce the images seen in FIGS. 3A-3B. A similar tens in C mount lens can also be employed.

Video Compression

Ignoring compression, raw video data can be generated by the camera 210 at the following rates: about 1 MB/frame, about 30 MB/second, about 108 GB/hour, about 2.6 TB/day. When selecting a storage method, a variety of objectives can be considered. Depending upon the context of the video, eliminating certain elements of the video before long-team storage can be a valuable option. Additionally, applying filters or other forms of processing (e.g., by the controller 216) can be desirable when considering long-term storage. However, saving the original or raw video data can be a valuable solution for when the processing methods are later changed. An example of video compression tests is described below.

Several compression standards have been evaluated on video data collected for about 100 minutes at a pixel resolution of about 480×480, about 29 fps, and about 8 bits per pixel. Two lossless formats tested from the raw video were Dirac and H264. H264 has a slightly smaller file air but takes slightly more time to transcode. Dirac can be widely supported with subsequent transcoding to another format.

MPEG4 lossy format has also been evaluated because it is closely related to H264 and is known for having good control over the bit rate. There are two ways to set the bitrate. The first is to set a static bitrate which is constant throughout the entire encoded video and the second is to set a variable bitrate based upon deviation from the original video. Within ffmpeg using the MPEG4 encoder, setting a variable bitrate can be easily achieved through selecting a quality value (from 0-31 with 0 being near lossless).

Three different image compression methods are compared to an original (raw) captured video fame in FIGS. 6A-6D. The original image is shown in FIG. 4A. The three other methods are shown by a difference in pixel from the original in FIGS. 4B-4D and only show the effect of the compression. That is, how different the compressed image is from the original. Accordingly, low difference is better and higher compression ratio is better. As shown in FIG. 4B, compression performed according to the MPEG4 codec with the Q0 filter exhibits a compression ratio of 1/17. As shown in FIG. 4C, compression performed according to the MPEG4 codec with the Q5 filter exhibits a compression ratio of 1/237. As shown in FIG. 4D, compression performed according to the MPEG4 codec with the HQDN3D filter exhibits a compression ratio of 1/97.

Video data collected according to the disclosed embodiments have approximately 0.01% of the pixels changed (increased or decreased a maximum of 4% of their intensity)

from the original when using the quality 0 parameter (Q0 filter, FIG. 4B; Q0 HQDN3D filter, FIG. 4). This accounts for about 25 pixels per frame. The majority of these pixels are located in the boundary of shadows. It can be appreciated that changes in the image this small are along the scale of noise interfering with the camera 210 itself. With larger quality values (e.g., Q5, FIG. 4C), artifacts can be introduced to better compress the video data. These are often familiar with blocky pixelated artifacts appearing when care is not taken during compression.

In addition to these formats, other suitable lossless formats can be created to accommodate the datasets of individual users. Two of these include the FMF codec (fly movie format), and the UFMF codec (micro fly movie format). The purpose of these formats is to minimize extraneous information and optimize readability for tracking. Since these formats are lossless and function on a static background model, unfiltered sensor noise did not allow for any substantial data compression. The results of this compression evaluation are illustrated in Table 2.

TABLE 2

Compression Tests

| Codec | Filters | File Size (Bytes) | Notes |
| --- | --- | --- | --- |
| Raw | None | 41,911,246,848 | |
| Dirac | None | 15,568,246,208 | Lossless |
| H264 | None | 14,840,999,602 | Lossless |
| MPEG4 | Q0 | 2,471,731,352 | Lossy |
| Dirac | HQDN3D | 10,113,632,202 | Filtered |
| H264 | HQDN3D | 8,008,906,680 | Filtered |
| MPEG4 | HQDN3D Q0 | 429,522,590 | Lossy Filtered |
| FMF | None | 41,720,668,160 | Lossless |
| UFMF | None | 41,722,662,912 | Lossless |

In addition to the selection of codecs for data compression, reductions in the background noise of the image can also be desirable. Background noise is inherent with all cameras, often noted with a dark noise, which refers to the baseline noise within the image.

There are many methods for removing this noise including having longer exposure time, a wider aperture, and reducing the gain. However, if these methods directly influence the experiment, they are not a viable option. Therefore, ffmpeg's HQDN3D filter can be employed, which takes temporal and spatial information to remove small fluctuations.

Figure 6A:
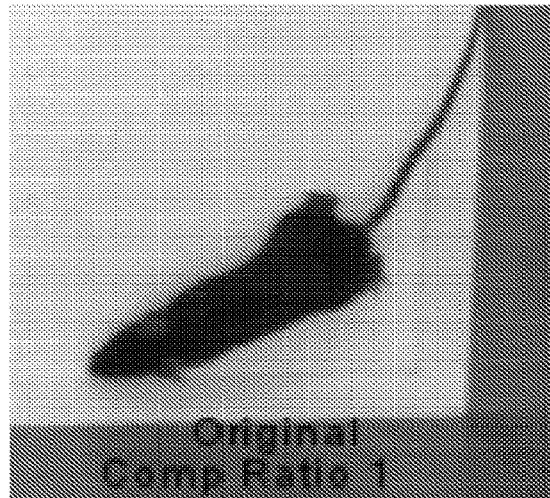
FIGS. 6A-6D are image illustrating exemplary embodiments of video frames subjected to different compression techniques; (A) No compression; (B) MPEG4 Q0, (C) MPEG4 Q5; (D) MPEG4 Q0 HQDN3D.
Figure 6B:
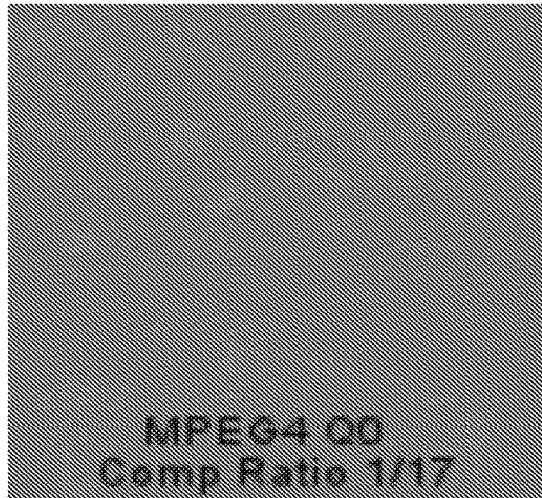
Figure 6C:
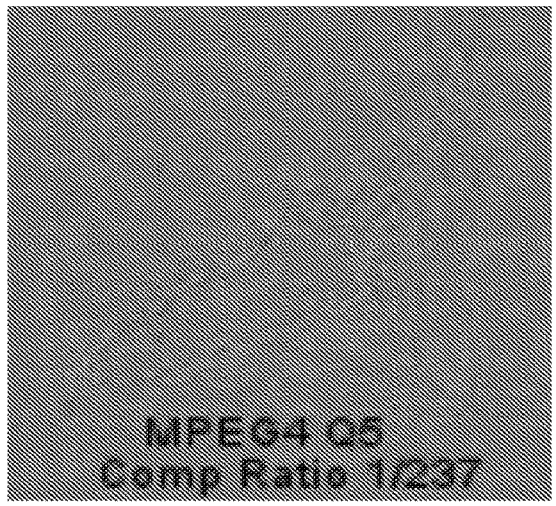
Figure 6D:
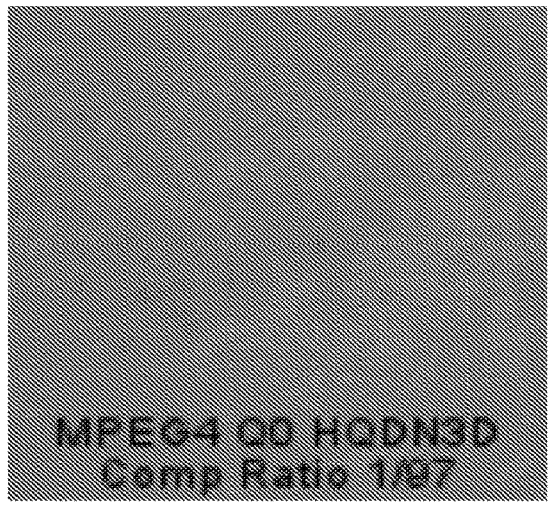

As shown in FIGS. 6B-6D, the HQDN3D filter is observed to provide a significant reduction in the file size of acquired video data (e.g., approximately 100× smaller as compared to the file size of the original video data). After compression employing the MPEG4 codec with the HQDN3D filter, the resulting average bitrate can be about 0.34 GB/hr of compressed video. Furthermore, substantially all loss of information was experimentally validated to be orders of magnitude less than what is generated from sensor noise (a video acquired in the absence of mice). This type of noise removal greatly enhances compressibility.

Unexpectedly, it has been discovered that the HQDN3D filter provides a significant increase the performance of tracking performed by a convolution neural network (CNN), which is discussed in detail below. Without being bound by theory, it is believed that this performance improvement is achieved because the HQDN3D liter is a variance-based background subtraction method. With a lower variance, the foreground is easier to identify and produces higher quality tracking.

Ultrasonic Audio Acquisition

Mice can vocalize in the Ultrasonic range for social communication, mating, aggression, and pup rearing (See e.g., Grimsley et al., 2011). Along with olfactory and tactile cues, this vocalization can be one of the most salient forms of mouse communication. Although not tested in mice, in humans, changes in voice and vocalization (presbyphonia) can define transitions such as puberty and aging (See e.g., Decoster and Debruyne, 1997; Martins et al., 2014; Mueller, 1997).

Accordingly, as discussed in detail below, embodiments of the arena 200 can further include one or more microphones 222. The microphones 222 can be mounted to the frame 202 and configured to acquire audio data from animals positioned in the enclosure 204. Synchronized data collection can be piloted by use of microphones 222 in the form of an array of microphones. This configuration of microphones 222 allows pinpointing of which mouse is vocalization. The ability to further determine which mouse is vocalizing among a group of mice has recently been demonstrated using a microphone array (See e.g., Heckman et al., 2017; Neunuebel et al., 2015).

A data collection setup can be provided similarly to Neunuebel et al. Four microphones can be positioned on sides of the arena that is able to capture sound. When integrated with video data, the mouse that is vocalizing can be identified using a maximum likelihood methods (See e.g., Zhang of al., 2008).

Environmental Sensors

In an embodiment, the arena 200 can further include one or more environmental sensors 224 configured to measure one or more environmental parameters, such as temperature, humidity, and/or light intensity (e.g., visible and/or IR). In certain embodiments, the environmental sensors 224 can be integrated and configured to measure two or more environmental parameters (e.g., Phenome Technologies, Skokie, IL). The environmental sensors 224 can be in electrical communication with the controller 216 for collecting daily temperature and humidity data along with light levels. Collected environmental data can be output for display in a user interface illustrating minimum and maximum temperature as well as lights activity (see discussion of control software below).

Software Control System

A software control system can be executed by the controller 216 for data acquisition and light control. The software control system can be configured to provide independent collection of video, audio/ultrasonic, and environmental data with corresponding timestamps. Data can be collected in this manner, uninterrupted, for any predetermined time period (e.g., one or more seconds, minute, hours, days, years, etc.) This can allow later compilation of synchronization of the acquired video, audio/ultrasonic, and/or environmental data for analysis or presentation.

Operating System

The choice of operating system can be driven by the availability of drivers for various sensors. For instance the Avisoft Ultrasonic microphone drivers are only compatible with Windows operating systems. The choice, however, may affect following:

Inter-Process Communication—The options for inter-process communications are affected by the underlying OS. Similarly, the OS affects the choices of communication between threads, although developing on a cross-platform framework like QT can bridge this.

Access to System Clock—The method of accessing the high-resolution system clock differs from one OS to another, as discussed in greater detail below.

Hardware Options

In certain embodiments, the control system can be implemented by the controller 216 in the form of single board computers. There are multiple options available including MilSpec/industrial computers that are highly robust for continued operation.

External Clock Vs. System Clock

Adequate real-time clock values can be available from the system clock without introducing an external dock into the system. On Posix systems the clock_gettime (CLOCK_MONOTONIC, . . . ) function can return seconds and nanoseconds. The resolution of the clock can be queried with the clock_getres( ) function. It can be desirable for the cock resolution of embodiments of the control system to be less than the frame period of about 33 milliseconds. In an embodiment, the system clock is an Unix system.

A GetTickCount64( ) system function has been developed to be used to get the number of milliseconds since the system was started. The expected resolution of this timer is between about 10 and about 16 milliseconds. This serves the same purpose as the clock_gettime( ) system call, although it can be beneficial to check and account for value wrapping.

On Macintosh computers, there is similar access to the system clock. The following code snippet was evaluated and observed sub-micro-second resolution.

clock_serv_t cclock;
mach_timespec_t mts;
host_get_clock_service(mach_host_self( ),SYSTEM_CLOCK,&cclock);
clock_get_time(cclock, &mts);

On any OS, the system calls that return the time of day can occasionally move backwards as adjustments are periodically made. In an embodiment, a system clock that increases monotonically can be employed. GetTickCount64( ), clock_gettime( ), and clock_get_time( ) can all satisfy this criterion.

Video File Size

It is unlikely that the camera vendor software will save adequately time-stamped output files automatically divided into reasonable size. It is desirable for embodiments of controller 216 to collect video data in an uninterrupted manner, reading each frame from the camera 210 and providing the collected video data in a simple form. For example, the controller 116 can be configured to provide the data storage device 220 with about 10 minutes of video frames per file in a raw format, with either a timestamp header or timestamp between frames. Each file would then be under 2 GB.

Control System Architecture

Figure 7:
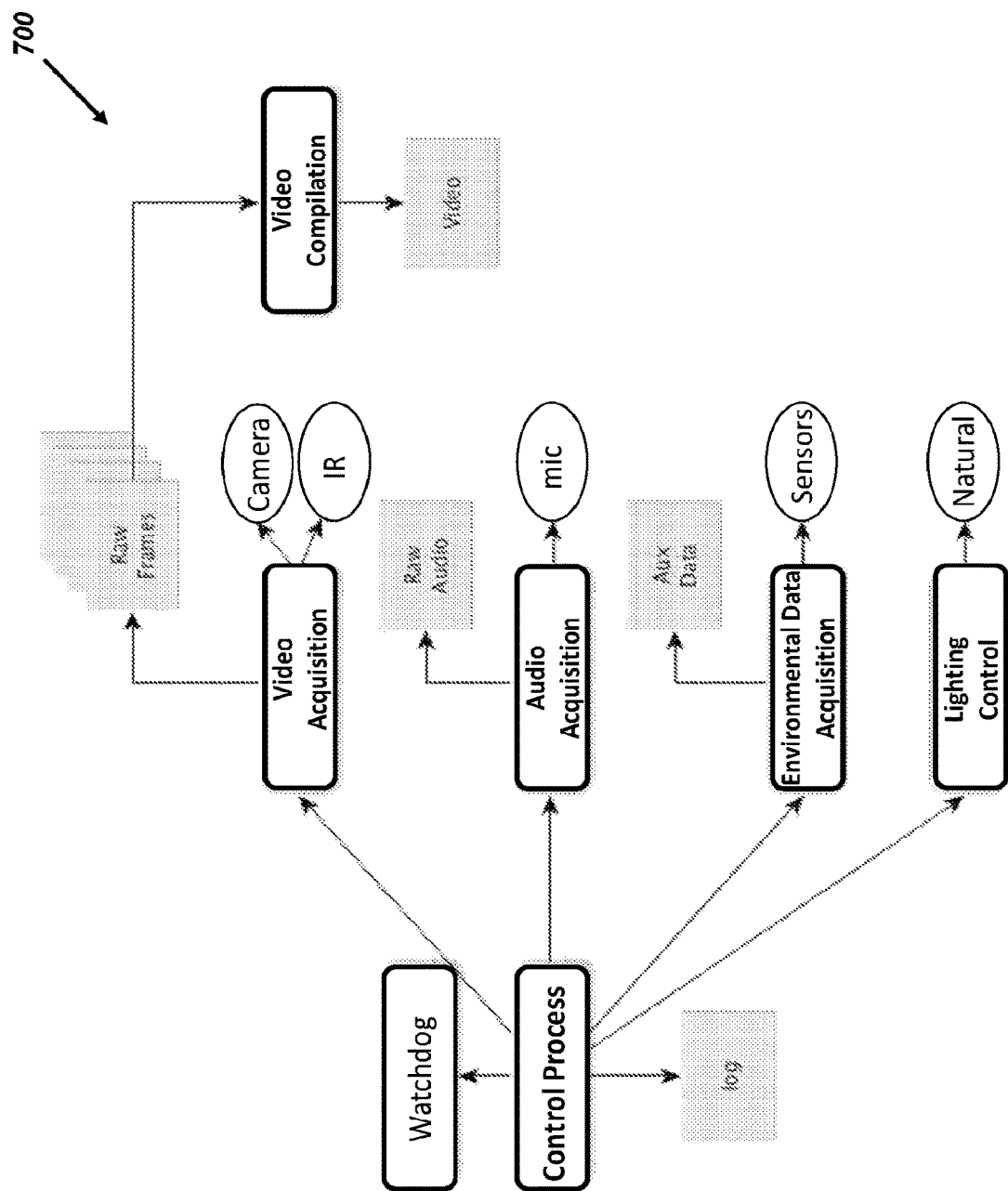
FIG. 7 is a diagram illustrating embodiments of components of an acquisition system suitable for use with the system of FIG. 2.

FIG. 7 is a block diagram illustrating components of an acquisition system 700. In certain embodiments, the acquisition system 700 can executed by the controller 216. Each block represents a separate process or thread of execution.

Controller Process

A control process can be configured to start and stop other process or threads. The control process can also be configured to provide a user interface for the acquisition system 700. The control process can be configured to save a log of activity and can keep track of errors encountered during acquisition (e.g., in a log). The control process can also be configured to restart processes or threads that have become inactive.

The method of communication between the components can be determined after the system OS is chosen. The user interface to the control process can be a command line interface or it can be a graphical interface. A graphical interface can be built on a portable framework, such as QT providing independence from the OS.

Video Acquisition Process

The video acquisition process can be configured to communicate directly with the camera 210, saving the timestamped frames to the data storage device 220. The video acquisition process can run at high priority, minimizing the likelihood of dropped frames. The video acquisition process can be kept relatively simple, with minimal processing between frames. The video acquisition process can also be configured to control the IR illumination emitted by the lights 212 to ensure proper exposure with minimal effective shutter speed.

Audio Acquisition Process

A separate audio acquisition process can be configured to acquire ultrasonic audio data with appropriate timestamps. In an embodiment, the audio system can include an array of microphones 222 placed in audio communication with the enclosure 204. In certain embodiments, one or more of the microphones 222 can be positioned within the enclosure 204. The microphones of the microphone array can possess one or more of the following capabilities: sampling frequency of about 500 kHz, ADC resolution of about 16 bits, frequency range of about 10 kHz to about 210 kHz, and anti-aliasing filter that is $8^{th}$ order and 210 kHz. As an example, the microphones of the microphone array can include Pettersson M500 microphones (Pettersson Elektronik AB, Uppsala Sweden) or functional equivalents thereof. As discussed above, audio data captured by the microphones 222 can be timestamped and provided to the controller 216 for analysis and/or the data storage device 220 for storage.

Environmental Data Acquisition Process

A separate environmental data acquisition process can be configured to collect environmental data, such as temperature, humidity, and lighting level. The environmental data can be collected at low frequency (e.g., about 0.01 Hz-0.1 Hz). The environmental data can be stored as a with a timestamp per record by the data storage device 220 (e.g., as one or more CSV files).

Lighting Control Process

A lighting control process can be configured to control the visible light emitted by the lights 212 in order to provide a daytime/nighttime cycle for the mice. In an embodiment, as discussed above, the camera 210 can be configured to filter out substantially all visible light, responding only to IR, and the visible lights can be filtered to produce no IR, so that this process can avoid affecting the video capture.

Video Compilation Process

A video compilation process can be configured to re-package the acquired video data into a pre-determined format with a pre-determined compression. This process can be kept separate from the video acquisition to minimize the chance of dropping frames. This video compilation process can be run as a low priority background task or even after data acquisition is complete.

Watchdog Process

A watchdog process can be configured to monitor the health of the data acquisition processes. As an example, it can log problems (e.g., in the log) and trigger restarts as necessary. The watchdog process can also listen for "heartbeats" from the components that it is watching over. In general, the heartbeats can be signals sent to the controller 216 which confirm that the components of the system 700 are operating normally. As an example, if a component of the system 700 ceases to function, lack of a heartbeat transmitted by this component can be detected by the controller 216. Following this detection, the controller 216 logs the event and can cause an alert to be annunciated. Such alerts can include, but are not limited to, audio alarms and visual alarms (e.g., lights, alphanumeric displays, etc). In alternative or addition to such alarms, the controller 216 can attempt to restart operation of the component, such sending a reinitialization signal or cycling power. The method of communication between the components of the system 700 and the controller 216 can depend on the choice of OS.

Mouse Marking

In certain embodiments, mice can be marked to facilitate tracking. However, as discussed in greater detail below, marking can be omitted and tracking can be facilitated by other techniques.

Marking mice for visual identification has several parameters that are not trivial to solve. In an embodiment, marking can be performed on mice that are long term (several weeks) in a manner that is not visible to the mice themselves, thus minimizing the effect on mouse communication and behavior. As an example, a tong term IR sensitive marker can be employed that is invisible in the normal mouse viewing range.

In an alternative embodiment, mice fur can be marked using human hair color and hair bleach. This approach can clearly identify mice for several weeks and can be used successfully in behavioral experiments (See e.g., Ohayon et al., 2013). However, the process of hair marking requires anesthetizing of mice, a process that is not acceptable for the present mouse monitoring system. Anesthesia changes physiology and hair dye itself can be an irritant that often changes mouse behavior. Since each DO mouse is unique, this can result in a dye/anesthesia×genotype effect and introduce unknown variable(s).

Further alternate methods of using IR-dye based markers and tattoos can also be employed and optimized.

In a further embodiment, for shaving can be employed to create patterns on the back of mice as a form of marking.

Data Storage

During the development phase, less than 2 TB of total data can be required. These data can include sample raw and compressed videos from various cameras and compression methods. Accordingly, data transfer of integrated USV and video data, as well as longer term 7-10 day long video data during the stress test can be achieved. The size of the videos can be reduced according to the compression standards chosen. Sample data storage estimates are provided below.
Testing:
1 Arena
Up to 5 Cameras
Duration of Videos: ~1-2 hrs each
Total ~10 GB, high end
Stress Test:
1 Arena
1 Camera
Duration of Video; 14 days
Resolution: 2× current (960×960)
Total ~2 TB
Production:
120 Total Runs (12-16 arenas, 80 animal per group run, staggered experiments)
Duration (each) 7 days
Resolution: 2× current (960×960)
32.25 TB II. Animal Tracking Video tracking of animals, such as mice, cannot be carried out in complex and dynamic environments or with genetically heterogeneous animals in existing animal monitoring systems without high level of user involvement making large experiments unfeasible. As discussed below, attempts to track a large number of different mouse strains in multiple environments using existing systems and methods and demonstrate that these systems and methods are inadequate for data sets of large scale experiments.

An exemplary dataset that contained mice of diverse coat colors, including black, agouti, albino, grey, brown, nude, and piebald, was used for analysis. All animals were tested in accordance with approved protocols from JAX-IACUC, outlined below. Mice were tested between 8 and 14 weeks of age. The dataset included 1857 videos of 59 strains totaling 1702 hours.

All animals were obtained from The Jackson Laboratory production colonies. Adult mice aged 8 to 14 weeks were behaviorally tested in accordance with approved protocols from The Jackson Laboratory Institutional Animal Care and Use Committee guidelines. Open field behavioral assays were carried out as described Kumar, 2011. Briefly, group-housed mice were weighed and allowed to acclimate in the testing room for 30-45 minutes before the start of video recording. Data from the first 55 minutes of activity are presented here. Where available, 8 males and 8 females were tested from each inbred strain and F1 isogenic strain.

In one aspect, it can be desirable to track multiple animals in the same open field apparatus (e.g., arena 200) with a white background. Examples of full frame and cropped video images acquired by the video acquisition system are illustrated in FIG. 8A, row 1 (Full Frame) and row 2 (Cropped). Examples of ideal and actual tracking fames are shown in each environment for the various genetic backgrounds (FIG. 8A, row 3 [Ideal Tracking] amid row 4 [Actual Tracking]).

In another aspect, it was desired to carry out video analysis of behavior in challenging environments, such as a an embodiment of the arena 200 that included food and water cup and the Knockout Mouse Project (KOMP2) at the Jackson Laboratory (FIG. 8A, columns 5 and 6, respectively).

In the 24-hour apparatus, mice were housed in the arena 200 with white paper bedding and food/water cup. The mice were kept in the arena 200 and continuous recording was carried out in light and dark conditions using infrared light emitted by the lights 212. The bedding and food cups were moved by the mouse and visible light emitted by the lights 212 was changed over the course of each day to simulate the light/dark cycle.

The KOMP2 project has collected over five years of data, and it was desired to carry out video-based recording as an added analysis modality to detect gait affects that cannot be identified by beam break systems. In gait analysis, the movement of animals is analyzed. If an animal has abnormal gait, abnormalities such and skeletal, muscular, and/or neural can be derived. The KOMP2 project uses a beam break system in which mice are placed in a clear polycarbonate box with infrared beams on all sides. The floor of the matrix is also polycarbonate, with the underlying bench surface being dark grey. It can be observed that some boxes, placed at the junction of two tables, can leave a joint, and lights overhead (e.g., LED lights) can cause unique high glare on all boxes.

In one aspect, tracking this dataset of videos was attempted using Ctrax, a modern open source tracking tool that uses background subtraction and blob detection heuristics. Ctrax abstracts a mouse on a per frame basis to five metrics, major and minor axis, x and y location of center of the mouse, and the direction of the animal (Branson, 2009). It utilizes the MOG2 background subtraction model, where the software estimates both the mean and variation of the background of the video for use in background subtraction. Ctrax uses the shape of the predicted foreground to fit ellipses.

In another aspect, tracking this data set of videos was attempted using LimeLight, a commercially available tracking software that uses a proprietary tracking algorithm. Lime light uses a single key frame background model for segmentation and detection. Once a mouse is detected. Lime Light abstracts the mouse to a center of mass using proprietary algorithm.

The dataset contains significant challenges to these existing analysis systems. As an example, the combination of mouse coat colors and environments were difficult to handle with Ctrax and Lime Light. In general, environments exhibiting high contrast, such as darker mice (e.g., black, agouti) on the white background yielded good tracking results. However, environments having less contrast, such as lighter color mice (e.g, albino, grey, or piebald mice) on the white background yielded poor results. A black mouse in a white open field achieves high foreground-background contrast and therefore actual tracking closely matches the ideal. Grey mice are visually similar to the arena walls and therefore often have their nose removed while rearing on walls. Albino mice am similar to the background of the arena itself and are frequently not found dung tracking. Piebald mice are broken in half due to their patterned coat color. While attempts were made to optimize and fine-tuned Ctrax for each video, a significant number of bad tracking frames were still observed, as shown in the actual tracking results of FIG. 8A, row 4 (Actual Tracking) as compared to row 3 (Ideal Tracking). Discarding bad tracking frames can lead to biased sampling and skewed biological interpretation and is undesirable.

These errors were observed to increase as the environment became less ideal for tracking, such as the 24-hour and KMOP2 environments. Furthermore, the distribution of the errors was not random. For instance, tracking was found to be highly inaccurate when mice were in the corners, near walls, or on food cups, as shown in FIG. 8, row 4 (Actual Tracking) but less inaccurate when animals were in the center. Placing a food cup into the arena in the 24-hour environment causes tracking issues when the mouse climbs on top. Arenas with reflective surfaces, such as KOMP2, also produce errors with tracking algorithms.

Further exploration of the causes of bad tracking and found that, in most cases, improper tracking is due to poor segmentation of the mouse from background. This included instances when the mouse was removed from foreground or the background was included in the foreground due to poor contrast. Traditionally, some of these hurdles have been addressed by changing the environment for optimized video data collection. For instance, to track albino mice, one can change background color of open field to black and increase contrast. However, such environmental changes are not suitable in the present context, as the color of the environment affects behavior of the mice and humans and such manipulation can potentially confound the experimental results (Valdes, 1994; Kulesskaya, 2014). Additionally, such solutions can fail to work for piebald mice, in the 24-hour data collection system, or the KOMP2 arena.

Since Ctrax uses a single background model algorithm, tests were performed to determine whether other background models could improve tracking results. 26 different segmentation algorithms (Sobral, 2013) were tested and it was discovered that each of these traditional algorithms performs well under certain circumstances and fails in other places, as shown in FIG. 8B. Other available systems and methods for animal tracking including rely on background subtraction approaches for tracking. Since all 26 background subtraction methods failed, it is believed that the results for Ctrax and Limelight are representative for these other technologies. It is believed that these segmentation algorithms fail due to improper segmentation.

Thus, while many tracking solutions exist for analysis of video data, attempts to overcome the fundamental issue of proper mouse segmentation in order to achieve high fidelity mouse tracking with representative examples of existing solutions were unsuccessful. None address the fundamental problem of mouse segmentation appropriately and generally rely on environmental optimiaation to achieve proper segmentation, therefore creating potential confounds.

Furthermore, the time cost for fine-tuning the background subtraction algorithm parameters can be prohibitive. For instance in tracking data from the 24-hour setup, when mice were sleeping in one posture for an extended period of time, the mouse became part of the background model and could not be tacked. Typical supervision would take an experienced user minutes of interaction for each hour of video to ensure high quality tracking results. While this level of user interaction is tractable for smaller and restricted experiments, large scale and long-term experiments require a large time commitment to supervise the tracking performance.

Embodiments of the present disclosure overcome these difficulties and build a robust next generation tracker suitable for analysis of video data containing animals, such as mice. As discussed in detail below, artificial neural networks are employed that achieve high performance under complex and dynamic environmental conditions, are indifferent to genetics of coat color, and do not require persistent fine tuning by the user.

Convolutional neural networks are computational models that include multiple processing layers that team representations of data with multiple levels of abstraction. These method have dramatically improved the state-of-the-art in speech recognition, visual object recognition, object detection and many other domains such as drug discovery and genomics (LeCun, 2015). In one advantage, once an efficient network with suitable hyperparameters has been developed, neural networks can easily be extended to other tasks by simply adding appropriate training data. Accordingly, the disclosed embodiments provide a highly generalizable solution for mouse tracking.

Figure 8C:
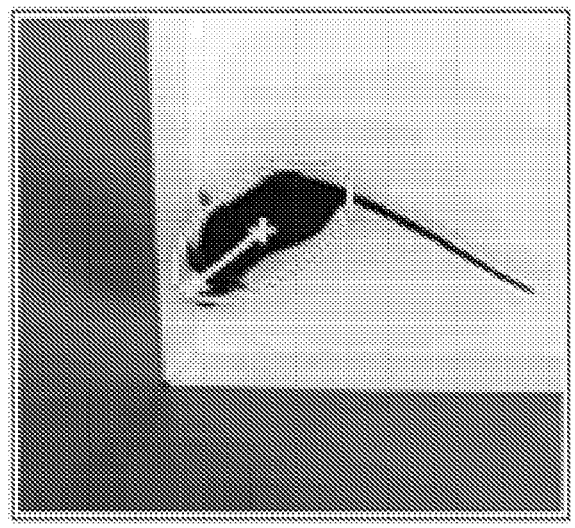
FIG. 8C is a schematic illustration of one exemplary embodiment of mouse tracking including objective tacking in the fun of an ellipse.

Neural Network Architectures 3 primary network architectures have been developed for solving the visual tracking problem. In an embodiment, objective tracking can take the form of an ellipse description of a mouse based upon a segmentation mask, as illustrated in FIG. 8C. See Branson, 2005. In alternative embodiments, shapes other than ellipses ca be employed.

The ellipse representation can describe the location of the animal through six variables, also referred to herein as parameters. In one aspect, one of the variables can be coordinates that define a location in a predetermined coordinate system (e.g., x and y of a Cartesian coordinate system) representing a pixel location of the mouse in an acquired video flame (e.g., a mean center location). That is, a unique pixel location within a plane. Optionally, if necessary, landmarks (e.g., corners of the enclosure 204) can be detected in the video fame to assist with determining the coordinates. In another aspect, the variables can further include a major axis length and a minor axis length of the mouse, and the sine and cosine of the vector angle of the major axis. The angle can be defined with respect to the direction of the major axis. The major axis can extend from about a tip of the animal's head (e.g., a nose) to an end of the animal's body (e.g, to about a point where the animal's tail extends from its body) in the coordinate system of the video frame. For clarity herein, cropped frames are illustrated as input into the neural networks while the actual input is an unmarked full frame.

Exemplary systems and methods for determining ellipse parameters utilizing neural network architectures are discussed in detail below. It can be understood that ether parameters can be utilized and determined by the disclosed embodiments, as appropriate.

Figure 9:
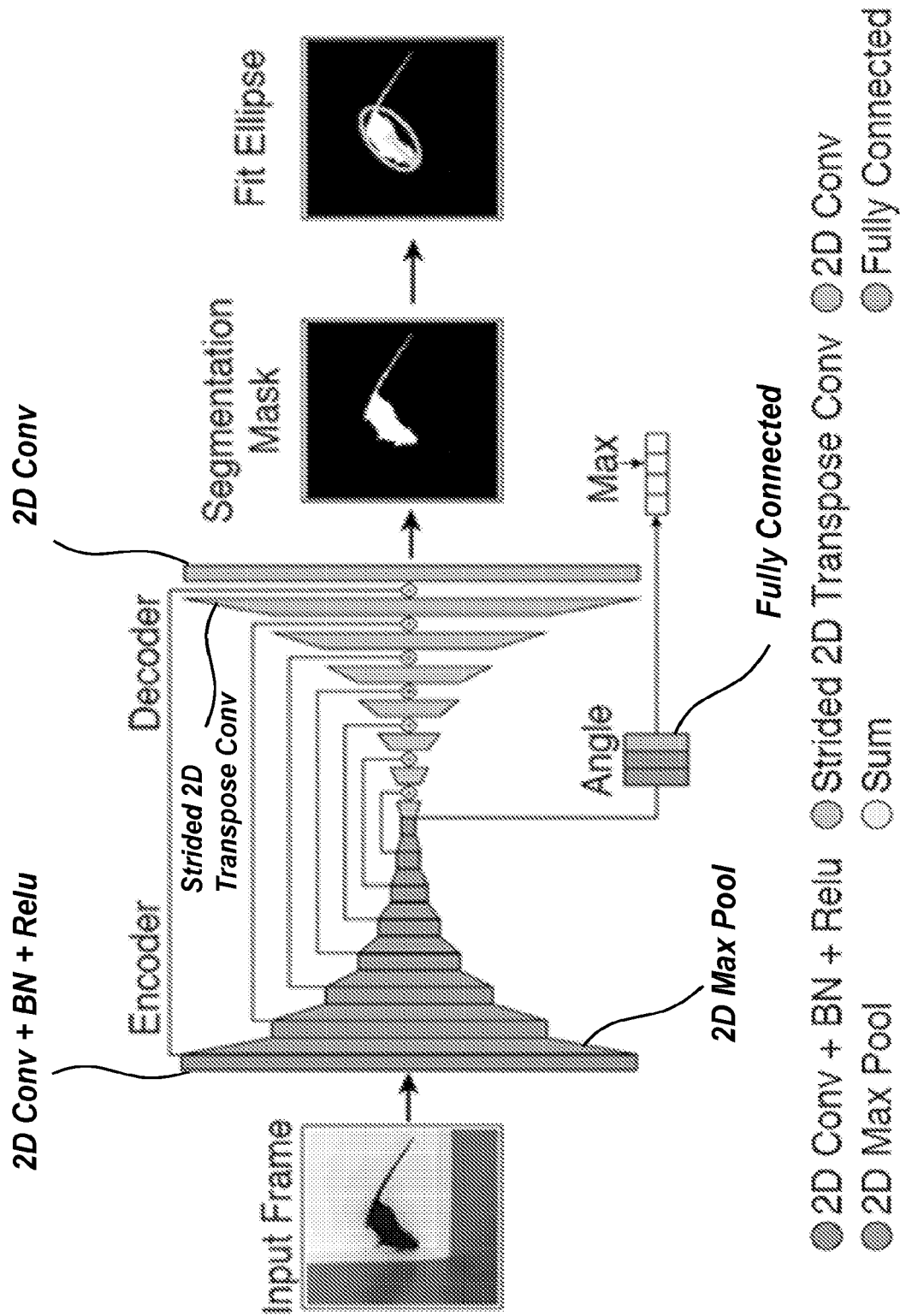
FIG. 9 is a schematic illustration of one exemplary embodiment of a segmentation network architecture.

In one embodiment, the first architecture is an encoder-decoder segmentation network. As shown in FIG. 9, this network predicts a foreground-background segmented image from a given input fame and can predict on a pixel-wise basis whether there is a mouse or no mouse, with the output being a segmentation mask.

This first architecture includes a feature encoder, which is configured to abstract the input into a small spatial resolution set of features (e.g., 5×5 as opposed to 480×480). A number of parameters are assigned to the neural network to learn. Learning can be performed by supervised training, where the neural network is presented with examples and tunes the parameters to yield a correct prediction. A full description of the final model definitions and the training hyperparameters are illustrated below in Table 3.

TABLE 3

Training Hyperparameters

| Model | Parameter | Value |
|---|---|---|
| All | Rotation | ±2.5 deg. |
| | Translation | ±5.0 px. |
| | Additive Noise | $\mu = 0.0, \sigma = 5.0$ |
| | Brightness | ±5% |
| | Contrast | ±5% |
| Encoder-Decoder Segmentation Network | Learning Rate | $10^{-5}$ |
| | Batch Size | 50 |
| Regression Network | Learning Rate | $10^{-5}$ |
| | Batch Size | 5 |
| Binned Classification Network | Learning Rate | $10^{-3}$ |
| | Batch Size | 25 |

The feature encoder is followed by a feature decoder which is configured to convert the small spatial resolution set of features back into the same shape as the original input image. That is, the learned parameters in the neural network reverse the feature encoding operation.

3 fully connected layers are added to the encoded features to predict which cardinal direction the ellipse is facing. Fully connected layers can refer to neural network layers, where each number in a given layer is multiplied by a different parameter (e.g., a learnable parameter) and summed together to produce a single value in a new layer. This feature decoder can be trained to produce a foreground-background segmented image.

The first half of the network (encoder) utilizes 2D convolutional layers followed by batch normalization, a ReLu activation, and 2D max pooling layers. Additional details can be found in Goodfellow, 2016.

A starting filter size of 8 that doubles ater every pooling layer was employed. The kernels used are of shape 5×5 for 2D convolution layers and 2×2 for max pooling layers. The input video is of shape 480×480×1 (e.g., monochromatic) and, after 6 of these repeated layers, the resulting shape is 15×15×128 (e.g., 128 colors).

In alternative embodiments, pooling layers of other shapes, such as 3×3 can be employed. The repeated layers represent a repeated structure of layers. The neural network learns different parameters for each layer and the layers are stacked. While 6 repeated layers am discussed above, greater or fewer number of repeated layers can be employed.

Another 2D convolutional layer (kernel 5×5, 2× filters) is applied followed by a 2D max pool with a different kernel of 3×3 and stride of 3. The 15×15 spatial shape can be decreased more by using a factor of 3. A typical max pool is kernel 2×2 stride of 2, where each 2×2 grid selects the maximum value and produces 1 value. These settings select the maximum in a 3×3 grid.

A final 2D convolutional layer is applied to yield the feature bottleneck with a shape of 5×5×512. The feature bottleneck refers to the encoded feature set, the actual matrix values output from all these matrix operations. The learning algorithm optimizes the encoded feature set to be the most meaningful for the task the encoded feature set is trained to perform well on. This feature bottleneck is then passed to both the segmentation decoder and angle predictor.

The segmentation decoder reverses the encoder using strided transpose 2D convolutional layers and caries over pre-downsampled activations through summation junctions. It should be noted that this decoder does not utilize ReLu activations. Pre-downsampled activations and summation junctions can also be referred to as a skip connection. Since the features at a layer while decoding match the same shape as the encoder layer, network is permitted to choose between encoding some ting better or keeping what it had during the encoder state.

After the layers get back to the 480×480×8 shape, an additional convolution is applied with a kernel size of 1×1 to merge the depth into 2 monochrome images: background prediction and foreground prediction. The final output is 480×480×2 (2 colors). A first color is designated to represent the background. A second color is designated to represent the foreground. The larger of the two, depending on each pixel, is what the network thinks that the input pixel is. As discussed below, a softmax operation re-scales these colors to became a cumulative probability that sums to 1.

Subsequently, a softmax is applied across this depth. The softmax is a form of classification or binmin into a group. Additional information regarding the softmax can be round in Goodfellow, 2016.

From the feature bottleneck, an angle prediction is also created. This is achieved by applying 2 2D convolution layers with batch normalization and ReLu activations (kernel size 5×5, feature depths 128 and 64). From here, one fully connected layer is flattened and used to yield a shape of 4 neurons which act for predicting the quadrant in which the mouse's head is facing. Further details regarding batch normalization, ReLu activations, and flattening can be found in Goodfellow, 2016.

Since the angle is predicted by the segmentation mask, only the correct direction (±180 deg.) needs to be selected. That is, because an ellipse is being predicted, them is only one major axis. One end of the major axis is in the direction of the head of the mouse. It is assumed that the mouse is longer along the head-tail axis. Thus, one direction is +180° (head) and the other direction is −180° (tail). The 4 possible directions that the encoder-decoder neural network architecture can select are 45-135, 135-225, 225-315 and 315-45 degrees on a polar coordinate grid.

These boundaries were selected to avoid discontinuities in angle prediction. Notably, as discussed above, the angle prediction is a prediction of the he sine and cosine of the vector angle of the major axis and employs an a tan 2 function. The a tan 2 function has discontinuities (at 180°) and the selected boundaries avoid these discontinuities.

Ater the network produces the segmentation mask, an ellipse fitting algorithm can be applied for tracking as described in Branson, 2009. While Branson uses a weighted sample mean and variance for these calculations, the segmentation neural network retains invariance to the situations in which they describe improvements. Shadows being cast can add errors to the segmentation masks produced by background subtraction algorithms. The neural network learns to not have these issues at all. Additionally, no significant difference between using weighted and unweighted sample means and variances is observed. Ellipse-fit parameters predicted from the weighted and unweighted approaches are not significantly different using masks predicted by embodiments of the disclosed neural network.

Given a segmentation mask the sample mean of pixel locations is calculated to represent the center position.

$$\mu_{x,y} = \frac{1}{N}\sum_i^N p_i \qquad (1)$$

Similarly, the sample variance of pixel locations is calculated to represent the major axis length (a), minor axis length (b), and angle (θ).

$$\sigma = \frac{1}{N}\sum_i^N (p-\mu_{x,y})(p-\mu_{x,y})^T \qquad (2)$$

To obtain the axis lengths and angle, an eigenvalue decomposition equation must be solved.

$$\sigma = U^T D U, \ U = \begin{pmatrix} \cos\theta & \sin\theta \\ -\sin\theta & \cos\theta \end{pmatrix}, \ D = \begin{pmatrix} \frac{a}{2} & 0 \\ 0 & \frac{b}{2} \end{pmatrix}^2 \qquad (3)$$

$$a = 2\sqrt{D_{11}}, \ b = 2\sqrt{D_{22}}, \ \theta = \text{atan}(U_{12}, U_{21}) \qquad (4)$$

Figure 10:
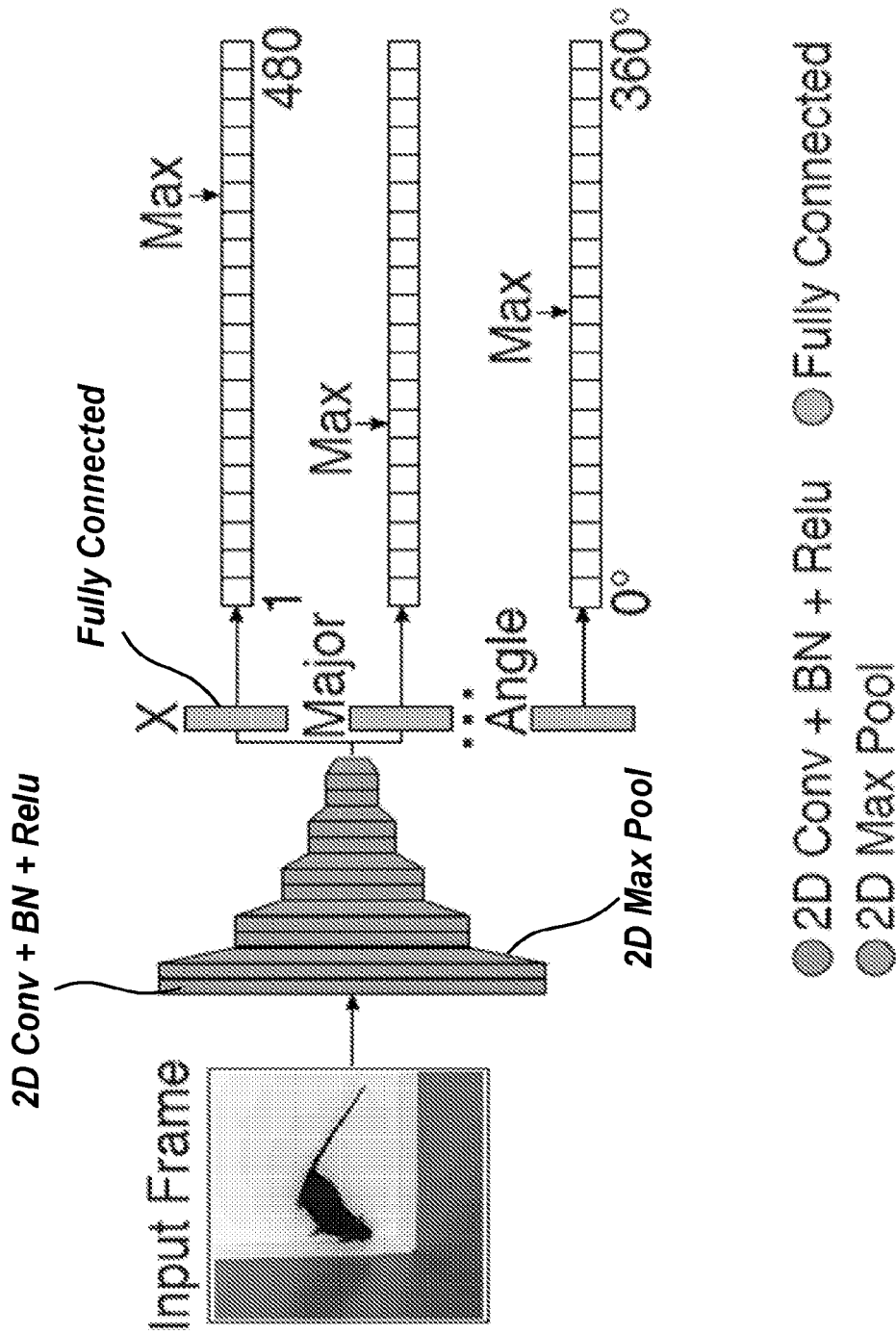
FIG. 10 is a schematic illustration of one exemplary embodiment of a binned classification network architecture.

The second network architecture is a binned classification network. The structure of the binned classification network architecture can predict a heat map of the most probable value for each ellipse-fit parameter, as shown in FIG. 10.

This network architecture begins with a feature encoder that abstracts the input image down into a small spatial resolution. While the majority of regression predictors realize the solution through a bounding box (e.g., a square or rectangle), an ellipse simply adds one additional parameter: the angle. Since the angle is a repeating series with equivalence at 360° and 0°, the angle parameter is transformed into its sine and cosine components. This yields a total of 6 parameters regressed from the network. The first half of this network encodes a set of features relevant to solving the problem.

The encoded features are flattened by converting the matrix (array) representing the features to a single vector. The flattened encoded features are then connected to additional fully connected layers whose output shape is determined by the desired resolution of output (e.g., by inputting the vector of features into the fully connected layer). For instance, for the X-coordinate location of the mouse, there are 480 bins, one bin for each x-column in the 480×480 pixel image.

When the network is run, the largest value in each heat map is selected as the most probable value. Each desired output parameter can be realized as an independent set of trainable fully connected layers connected to the encoded features.

A wide variety of pre-built feature detectors were tested, including Resnet V2 50, Resnet V2 101, Resnet V2 200, Inception V3, Inception V4, VGG, and Alexnet. The feature detectors represent convolutions that operate on the input image. In addition to these pre-built feature detectors, a wide array of custom networks were also surveyed. Resnet V2 200 is observed to perform the best from this survey.

Figure 11:
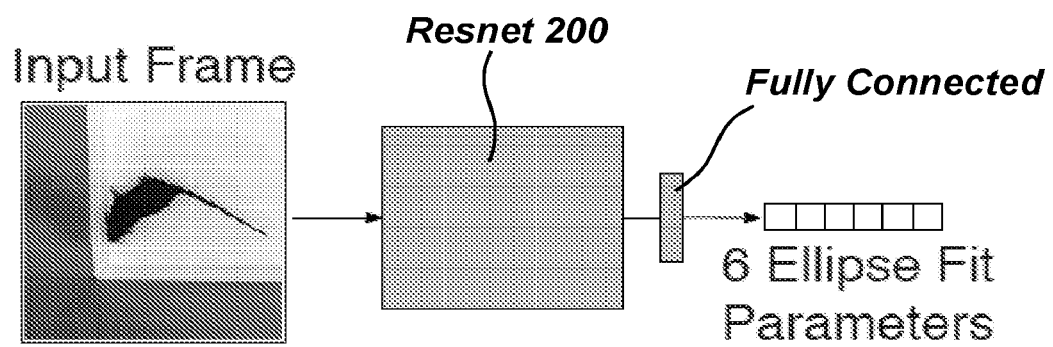
FIG. 11 is a schematic illustration of one exemplary embodiment of a regression classification network architecture.

The final architecture is a regression network, illustrated in FIG. 11. As an example, it takes the input video frame, extracts features through Resnet200 CNN and makes a direct prediction of the 6 parameters for the ellipse fit. Each value (6 for ellipse fit) is continuous can have infinite range. The network has to learn the ranges of values that are appropriate. In this manner, numerical ellipse values are predicted directly from the input image to describe a tracking ellipse. That is, instead of predicting the parameters directly, the regression network instead selects de most probable value from a selection of binned possible values.

The other neural network architectures operate in a different manner. The Encoder-decoder neual network architecture outputs probability that each pixel is a mouse or not a mouse. The binned classification neural network architecture outputs a bin that describes the location of the mouse. The classes for each parameter are predetermined and the network (encoder-decoder or binned) has to simply output a probability for each class.

The regression network architecture begins with a feature encoder which abstracts the input down into a small spatial resolution. In contrast to the previous architecture, the regression neural network training relics upon a cross entropy loss function, as opposed to a mean squared error loss function.

Due to memory limitations, only custom VGG-like networks were tested with reduced feature dimensions. The best performing network was structured with 2 2D convolutional layers followed by a 2D max pooling layer. The kernels used are of shape 3×3 for 2D convolutional layers and 2×2 for 2D max pooling layers. A filter depth of 16 is used initially and doubled after every 2D max pool layer. This 2 convolutional plus max pod sequence is repeated 5 times to yield a shape of 15×15×256.

This layer is flattened and connected to a fully connected layer for each output. The shape of each output is dictated by the desired resolution and range of the prediction. As an example, these encoded features were then flattened and connected to fully connected layers to produce an output shape of 6, the number of values the network is asked to predict to fit at ellipse. For testing purposes, only the enter location was observed and trained with a range of the entire image (0-480). Additional outputs, such as angle prediction, can be easily added as additional output vectors. A variety of modern feature encoders were tested and data discussed herein for this network are from Resnet V2 with 200 layers which achieved the best performing results for this architecture (He, 2016).

Training Dataset

In order to test the network architectures, a training dataset of 16,234 training images and 568 separate validation images across multiple strains and environments was generated using an OpenCV based labeling interface, as discussed below. This labeling interface allowed rapid labeling of the foreground and background, as well as ellipse fitting, and can be used to quickly generate training data in order to adapt any network to new experimental conditions through transfer learning.

Figures 12A, 12B:
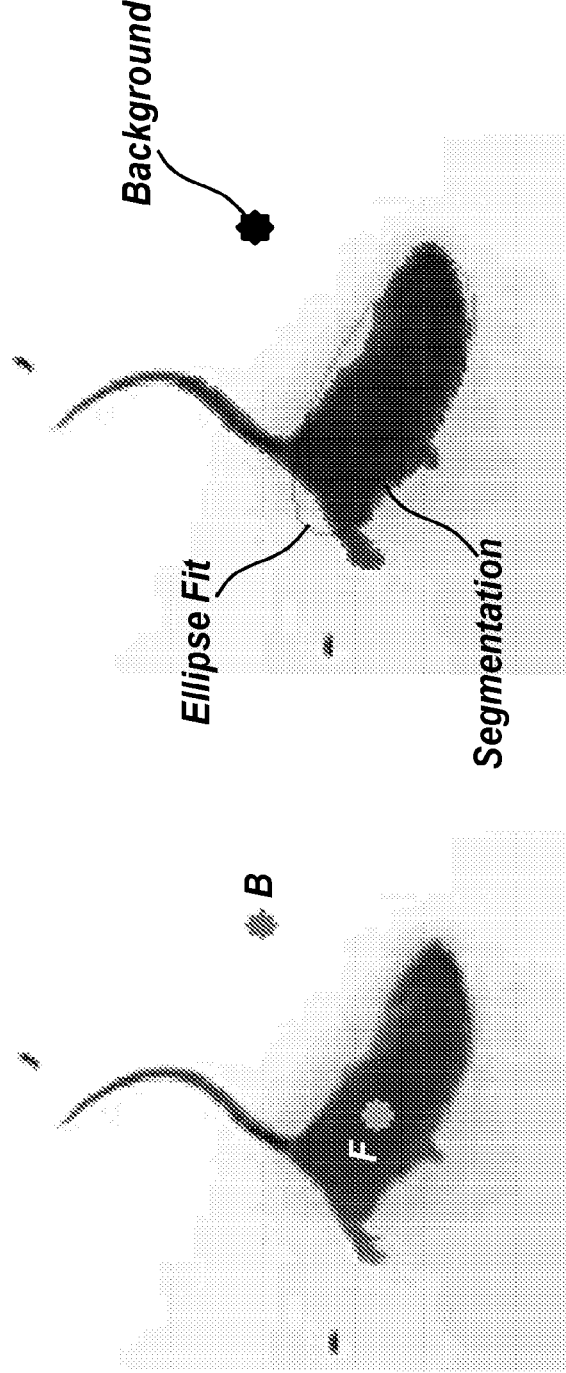
FIG. 12A is one exemplary embodiment of a graphical user interface illustrating placement of two marks for foreground (F) and background (B).
FIG. 12B is one exemplary embodiment of a graphical user interface illustrating the segmentation resulting from the marking or FIG. 12A.

The OpenCV library was employed to create an interactive watershed-based segmentation and contour-based ellipse-fit. Using this software, the user left clicks to mark points as the foreground (e.g., mouse; F) and right clicks to label other points as the background (B), as illustrated in FIG. 12A. Upon a keystroke, the watershed algorithm is executed to predict a segmentation and ellipse, as illustrated in FIG. 12B. If the user needs to make edits to the predicted segmentation and ellipse, they can simply label more areas and run the watershed again.

When the predictions are within a predetermined error tolerance range selected by the user of the neural network (e.g., a researcher), the user selects the direction of the ellipse. They do this by selecting one of four cardinal directions: up, down, left, right. Since the exact angle is selected by the ellipse-fitting algorithm, the user only needs to identify the direction ±90 degrees. Once a direction is selected, all the relevant data is saved and the user is presented with a new frame to label.

The objective of the annotated dataset is to identify good ellipse-fit tracking data for mice. While labeling data, the ellipse-fit was optimized such that the ellipse was centered on the mouse's torso, with the major axis edge approximately touching the nose of the mouse. Frequently, the tail was removed from the segmentation mask to provide a better ellipse-fit.

For training networks for inference, 3 annotated training sets were generated. Each dataset includes a reference frame (input), segmentation mask, and ellipse-fit. Each of the training sets was generated to track mice in a different environment.

The first environment was an open field with a constant white background, which contains 16,802 annotated fames. The first 16,000 frames were labeled from 65 separate videos acquired from one of 24 identical setups. After the first training of networks, it was observed that the networks performed poorly under special circumstances that had not bee included in the annotated data. Instances of mid-jump, odd postures, and urination in the arena were typically observed failures. These failures were identified, correctly labeled, and incorporated into the annotated training set to further generalize and improve performance.

A second environment was a standard open field with ALPHA-dribedding and a food cup under two distinct lighting conditions (day visible illumination and night infrared illumination). In this dataset, a total of 2,192 frames were annotated across 6 setups over 4 days. 916 of the annotated frames were taken from night illumination and 1,276 of the annotated frames were taken from the daylight illumination.

The final annotated dataset was created using the Opto-M4 Open Pied Cage for the KOMP dataset. This dataset included 1083 labeled frames. These labels were all sampled across different videos (1 frame labeled per video) and 8 different setups.

Neural Network Training a) Training Data Set Augmentation

This training dataset was augmented during training 8× by applying reflections and applied small random changes in contrast, brightness, rotations to make the network robust to minor fluctuations in input data. The augmentation is performed in order to inhibit the neural network from memorizing the training data set, which could result in poor performance on examples not in the data set (validation). Further discussion can be found in Krizhevsky, 2012.

Training set augmentation has been an important aspect of training neural networks since Alexnet (Krizhevsky, 2012). A handful of training set augmentation are utilized to achieve a good regularization performance. Since the data is from a birds-eye view, it is straight forward to apply horizontal, vertical, and diagonal reflections for an immediate 8× increase in the equivalent training set size. Additionally at runtime, small rotations and translations are applied for the entire frame. Rotation augmentation values are sampled from a uniform distribution. Finally, a noise, brightness, and contrast augmentation can also be applied to the frame. The random values used for these augmentations are selected from a normal distribution.

b) Training Learn Rate and Batch Size

Training learn rate and batch size were selected independently for each network training. While larger networks, such as Resnet V2 200, can run into memory limitations for batch sizes at an input size of 480×480, good learn rate and batch size were experimentally identified using a grid search approach. Hyperparameters selected for training these networks am illustrated above in Table 3.

Models

Models were built, trained, and tested in Tensorflow v1.0. Training benchmarks presented were conducted on the NVIDIA® Tesla® P100 GPU architecture.

Hyperparameters were trained through several training iterations. After the first training of networks, it was observed that the networks performed poorly under special circumstances that were underrepresented in the training data. Instances of mid-jump, odd postures, and urination in the arena were typically observed failures. These difficult frames were identified and incorporated into the training dataset to further improve performance. A full description of the final model definitions and the training hyperparameters are illustrated above in Table 3.

Figure 13A:
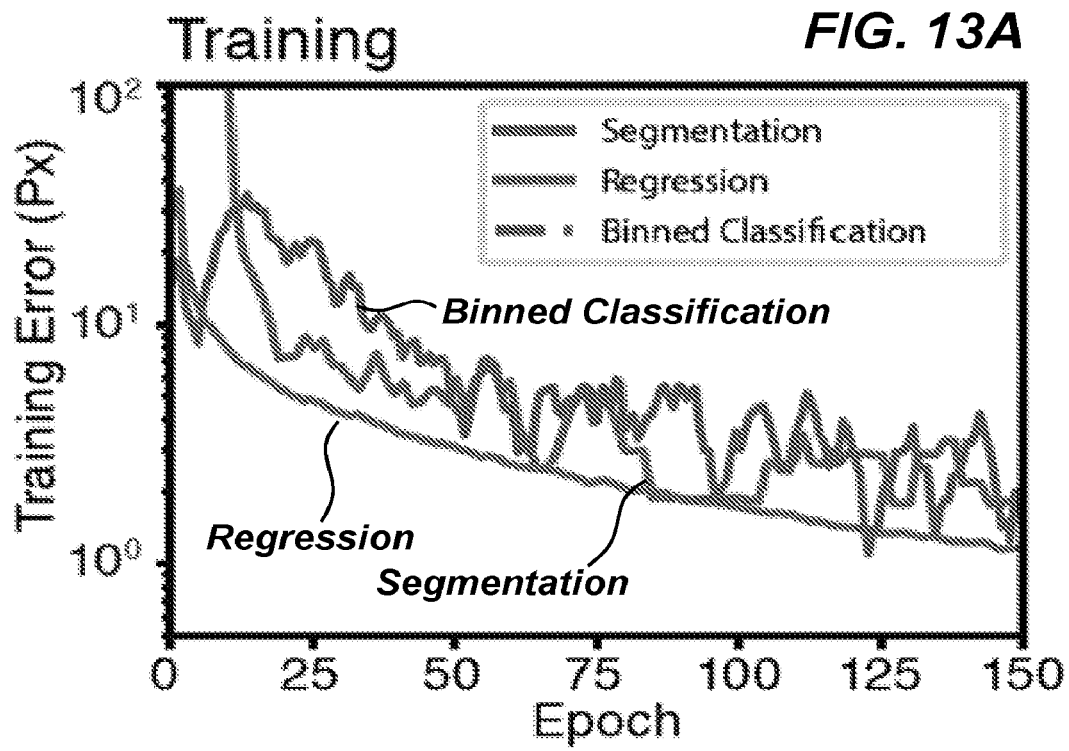
FIG. 13A is a plot of training curves for embodiments of the segmentation, regression, and binned classification networks of FIGS. 9-11.
Figure 13B:
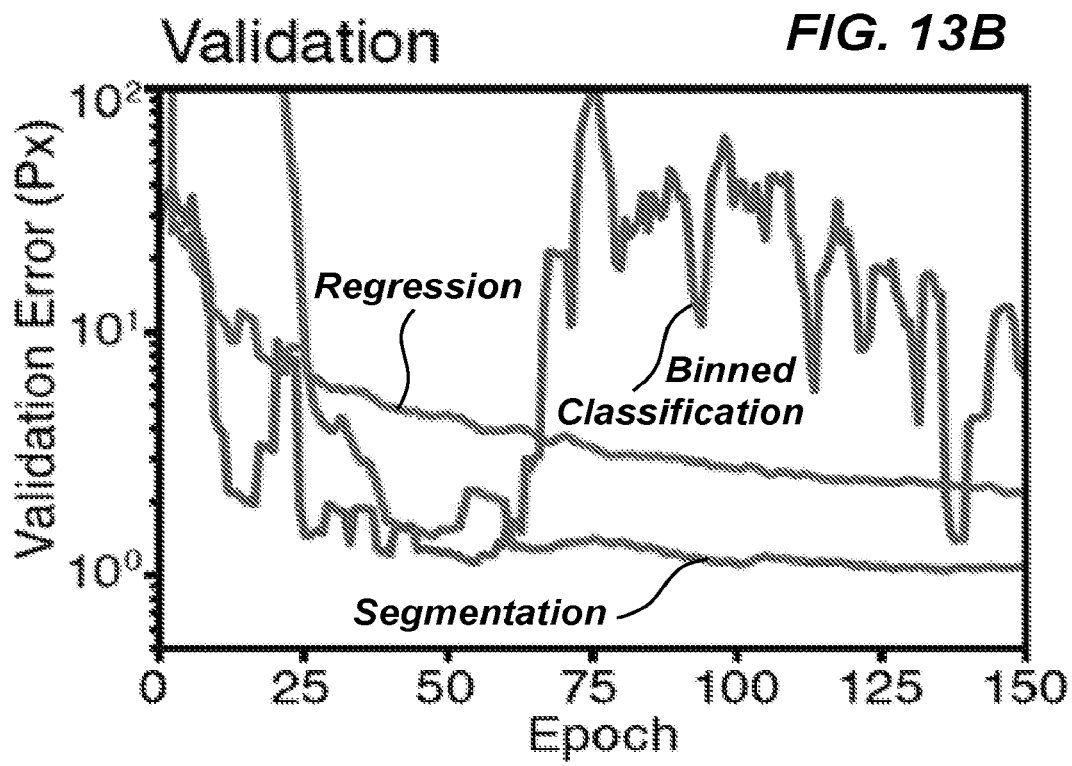
FIG. 13B is a plot of validation curves for embodiments of the segmentation, regression, and binned classification networks of FIGS. 9-11.
Figure 13C:
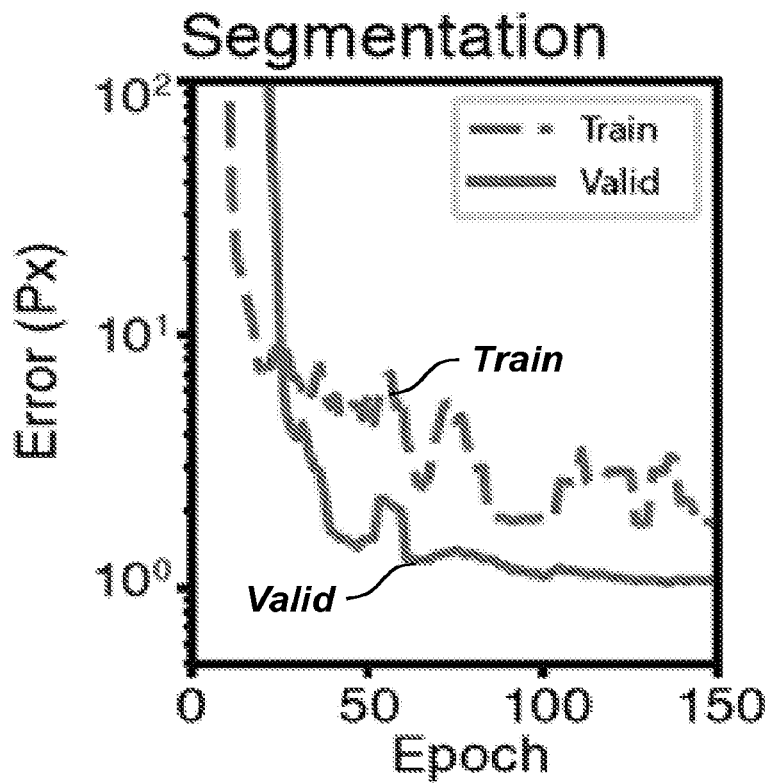
FIG. 13C is a plot illustrating training and validation performance of the segmentation network architecture of FIG. 9.
Figure 13D:
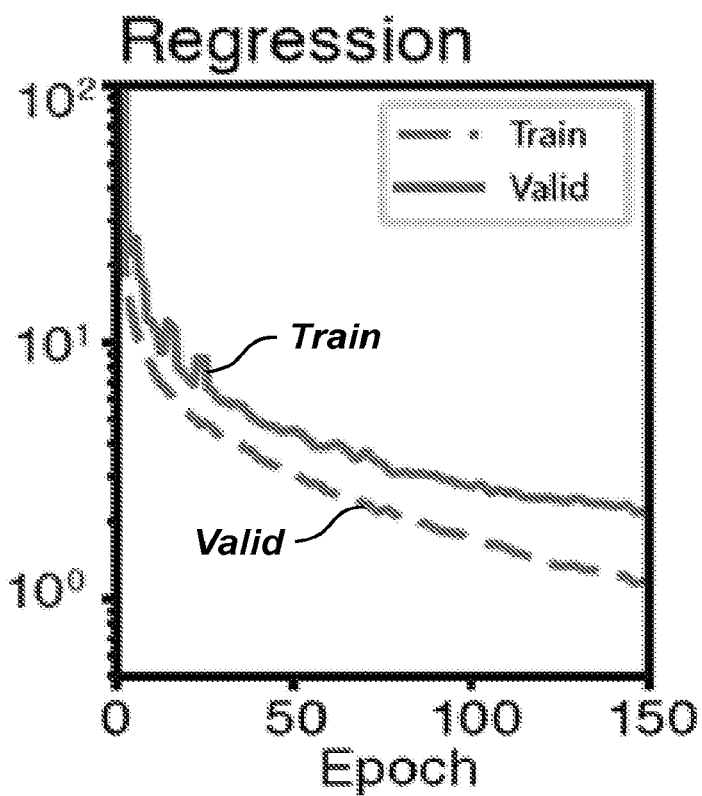
FIG. 13D is a plot illustrating training and validation performance of the regression network architecture of FIG. 11.
Figure 13E:
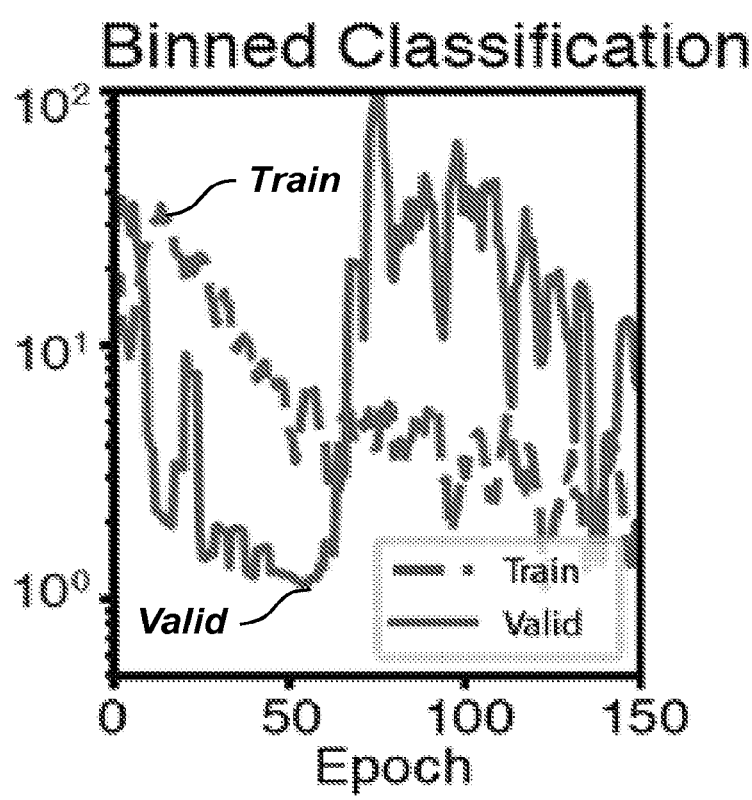
FIG. 13E is a plot illustrating training and validation performance of the binned classification network architecture of FIG. 10.

Plots of training and validation loss curves indicated by all three networks are illustrated in FIGS. 13A-13E, respectively. Overall, the training and validation loss caves indicate all three networks train to a performance between 1 and 2 pixels average error. Unexpectedly, the binned classification network displayed unstable loss curves, indicating overfitting and poor generalization on validation (FIGS. 13B, 13E). The regression architecture converged to a validation error of 1.2 px., showing better training performance than validation (FIGS. 13A, 13B, 13D). However, Resnet V2 200, the feature extractor that gave best results, is a large and deep network with over 200 layers and 62.7 million parameters and leads to a substantially longer processing time per frame (33.6 ms). Other pre-built general purpose networks (Zoph, 2017) can achieve similar or worse performance at a tradeoff of faster compote time. Thus, regression networks are an accurate but computationally expensive solution.

As further shown in FIGS. 13A, 13B, 13C, the encoder-decoder segmentation architecture converged to a validation error of 0.9 px. Not only does the segmentation architecture perform well, but it is also computationally efficient for GPU compute at an average processing time of 5-6 ms per frame. The video data could be processed up to 200 fps. (6.7× realtime) on Nvidia® Tesla® P100, a server grade GPU, and 125 fps (4.2× real time) on a Nvidia® Titan Xp, a consumer grade GPU. This high processing speed is likely due to the structure being only 18 layers deep and 10.6 million parameters.

The training set size was also benchmarked in order to identify a relative scale of the necessary labeled training data for good network performance for the encoder-decoder segmentation network architecture. This benchmark was tested through shuffling and randomly sampling a subset of the training set (e.g., 10,000, 5,000, 2,500, 1000, and 500). Each subsampled training set was trained and compared to an identical validation set. Results of this benchmarking are illustrated in FIGS. 14A-14H.

Figure 14A:
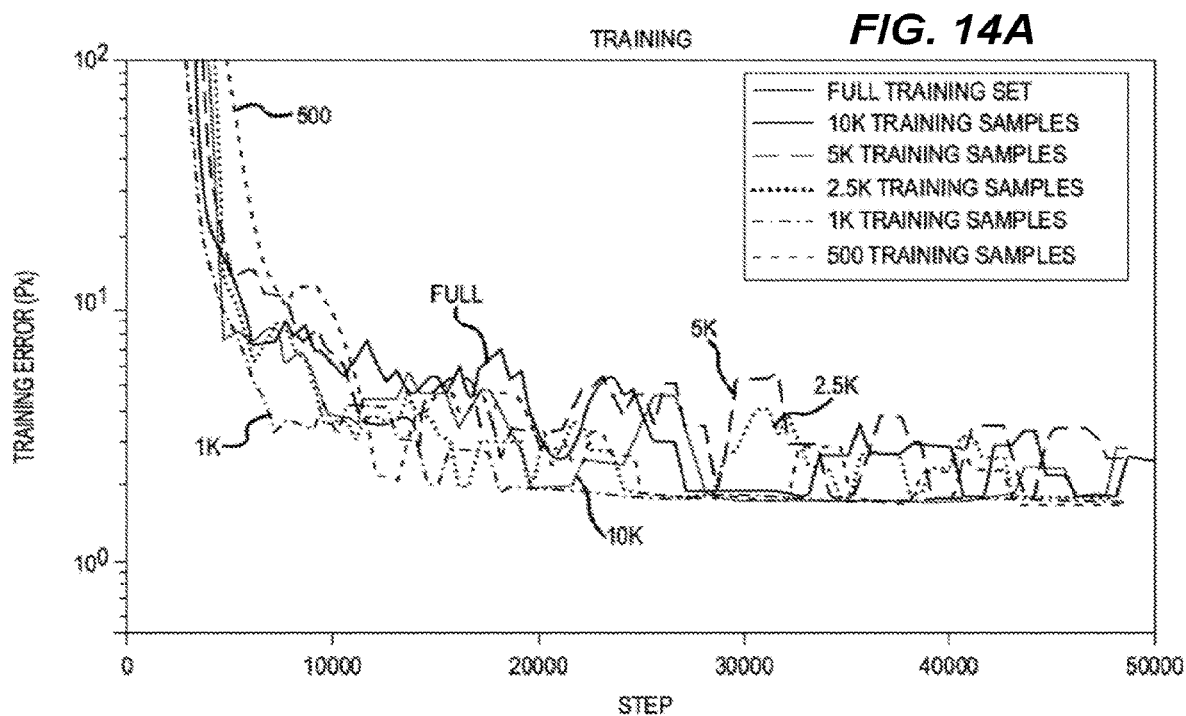
FIG. 14A is a plot illustrating training error as a function of step for training sets of different sizes according to embodiments of the disclosure.
Figure 14B:
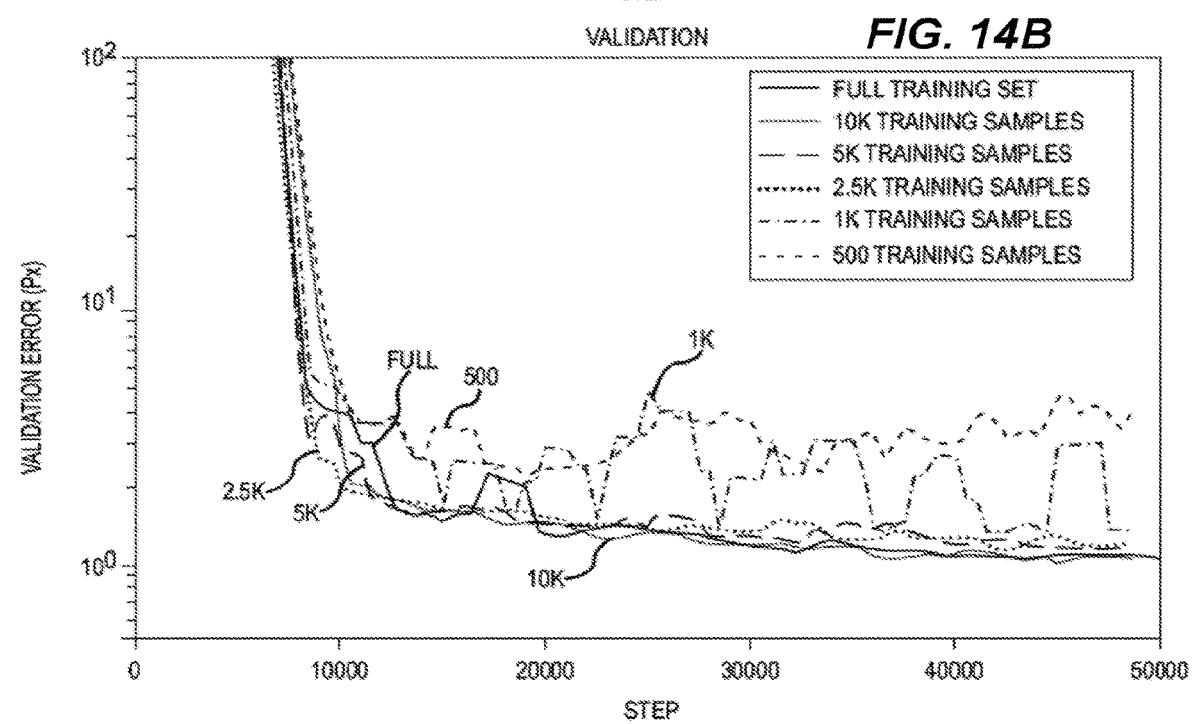
FIG. 14B is a plot illustrating validation error as a function of step for training sets of different sizes according to embodiments of the disclosure.
Figure 14C:
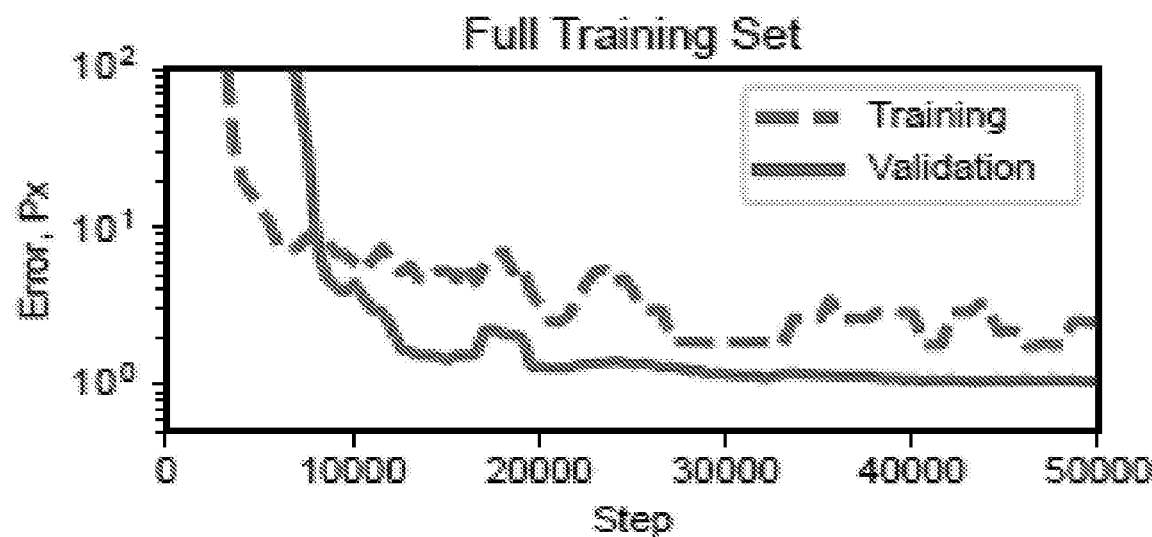
FIG. 14C is a plot illustrating training and validation error as a function of step for a full training set of training samples.
Figure 14D:
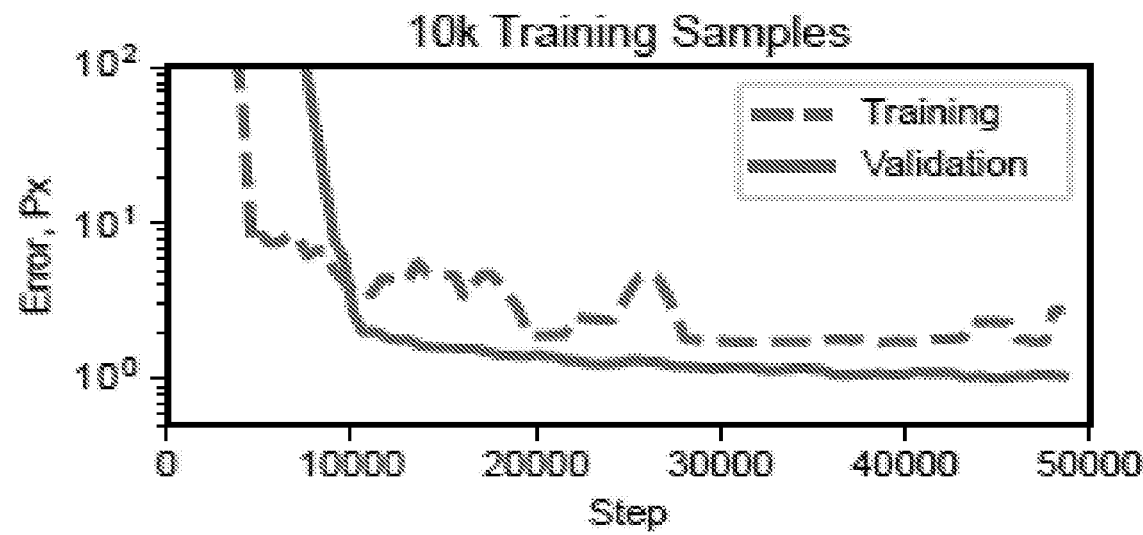
FIG. 14D is a plot illustrating training and validation error as a function of step for a training set including 10,000 (10 k) training samples.
Figure 14E:
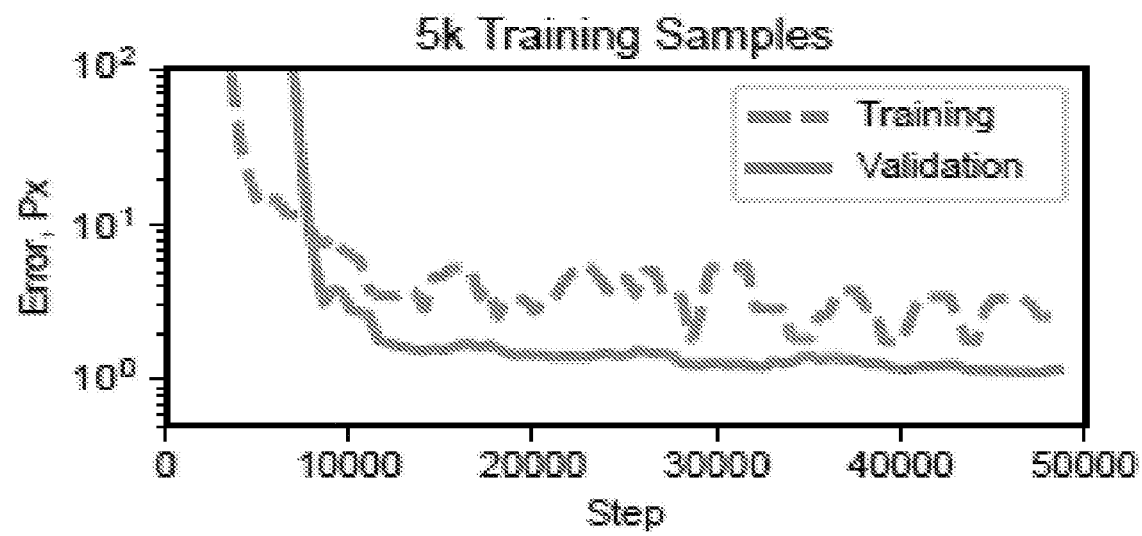
FIG. 14E is a plot illustrating training and validation error as a function of step for a training set containing 5,000 (5 k) training samples.
Figure 14F:
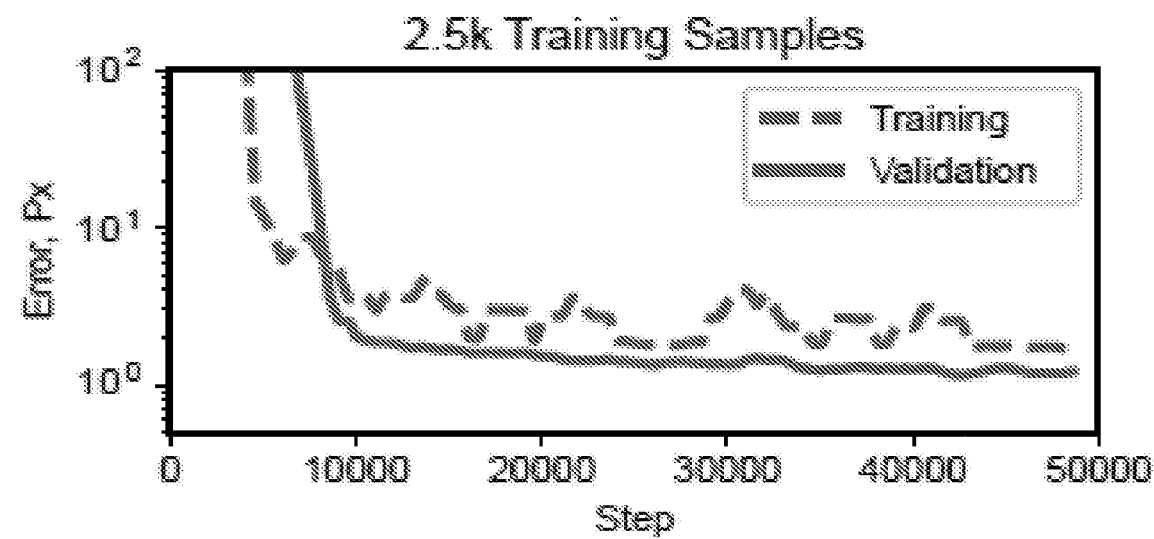
FIG. 14F is a plot illustrating training and validation error as a function of step for a training set containing 2,500 (2.5 k) training samples.
Figure 14G:
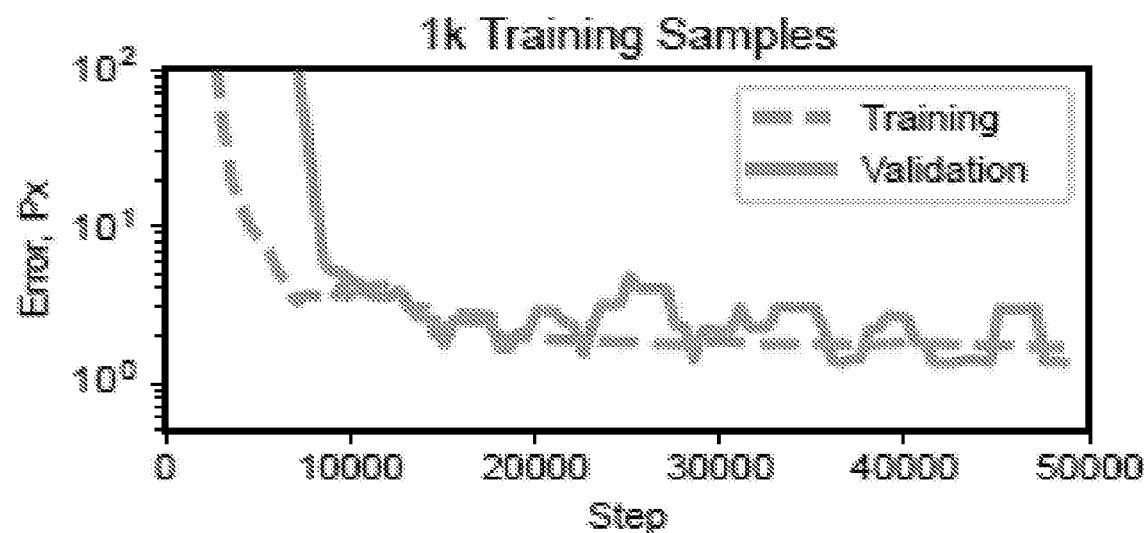
FIG. 14G is a plot illustrating training and validation error as a function of step for a training set containing 1,000 (1 k) training samples.
Figure 14H:
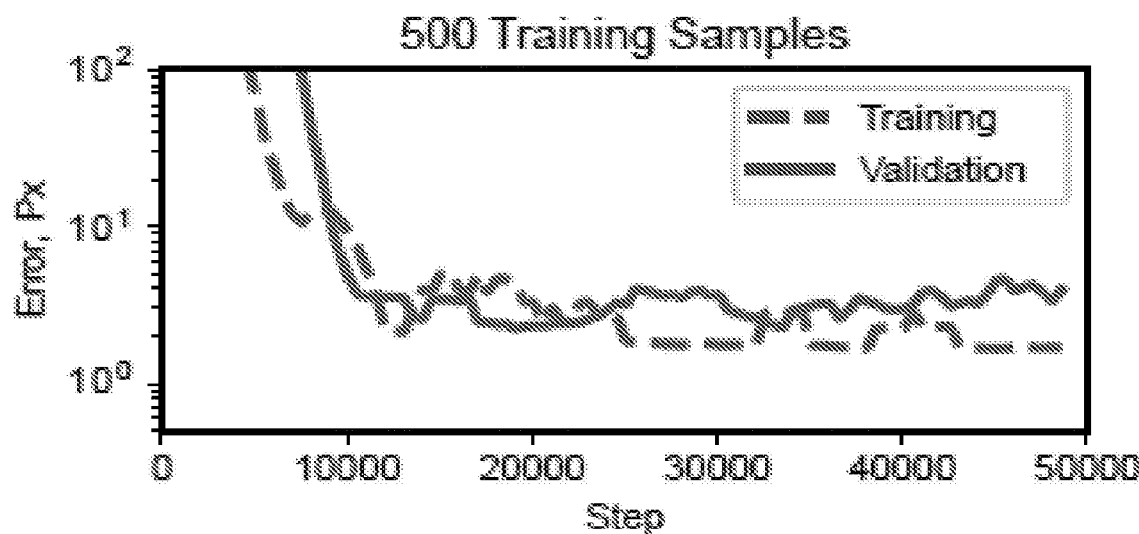
FIG. 14H is a plot illustrating training and validation error as a function of step for a training set containing 500 training samples.

In general, the training curves appear to be indistinguishable (FIG. 14A). That is, the training size set shows no performance change in training set error rate (FIG. 14A). Surprisingly, validation performance converges to the same value above 2,500 training samples but error is increased below 1,000 training samples (FIG. 14B). As further shown, validation accuracy outperforms training accuracy while above 2,500 training samples (FIGS. 14C-14F), while validation accuracy begins to show signs of weak generalization by only matching training accuracy at 1,000 (FIG. 14G). Using only 500 training samples is clearly overtraining, as illustrated by the diverging and increasing validation error rate (FIG. 14H). This suggests that the training set is no longer large enough to allow the network to generalize well. Thus, good results can be obtained from a network trained only with 2,500 annotated images, which takes approximately 3 hours to generate with the labeling interface. Accordingly, while the exact number of training samples will ultimately rely upon the difficulty of the visual problem, a recommended starting point would be around 2,500 training samples.

Figure 15A:
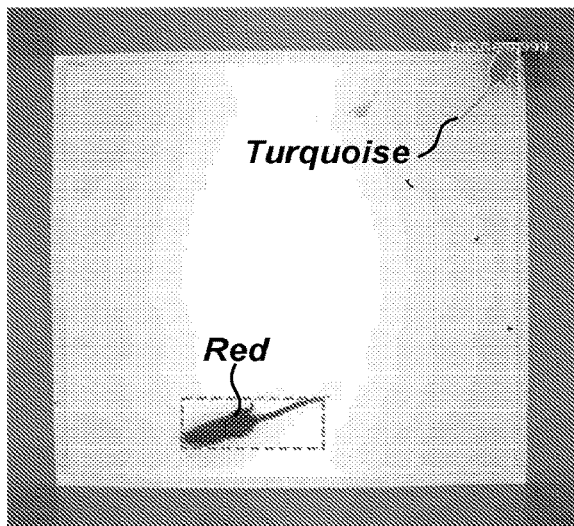
FIGS. 15A-15D are frames of captured video data with an overlaid color indication differentiating respective mice from another; (A-B) visible light illumination; (C-D) infrared light illumination.
Figure 15C:
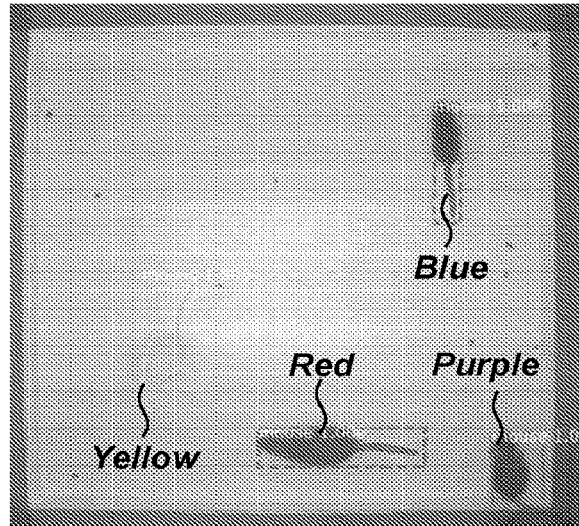
Figure 15B:
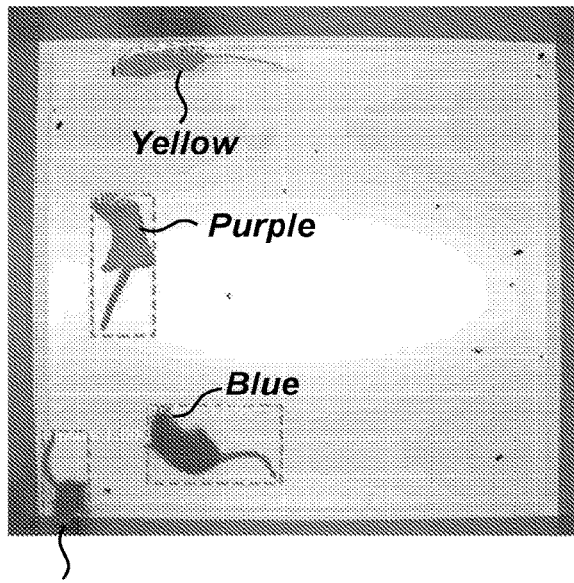
Figure 15D:
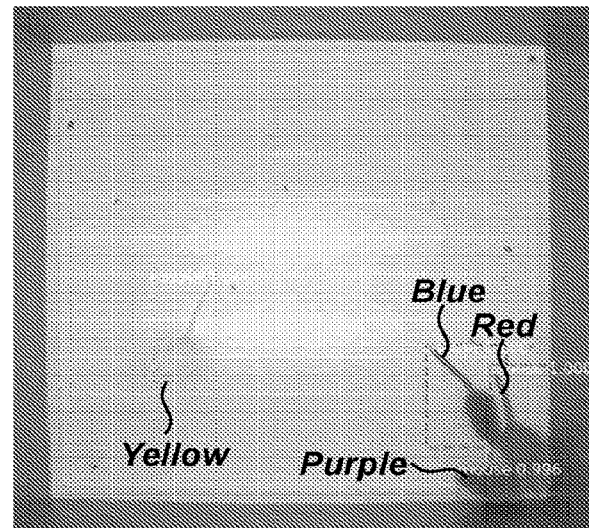

Exemplary video frames illustrating mice tracked according to the disclosed embodiments are illustrated in FIGS. 15A-15B under visible light and in FIGS. 15C-15D under infrared light. As shown, the spatial extent of individual mice are color coded on a pixel-by-pixel basis.

Given its COMPUTATIONAL efficiency, accuracy, training stability, and low number of required training data, the encode-decoder segmentation architecture was selected for predicting the location of mice for entire videos for comparison with other approaches.

The quality of the neural network based tracking was evaluated by inferring entire videos from mice with disparate coat colors and data collection environments (FIG. 8A) and visually evaluating the quality of tracking. The neural network based tracking was also compared with an independent modality of fracking, the KOMP2 beam break system (FIG. 8A, column 6).

Experimental Arenas a) Open Field Arena

An embodiment of the arena 200 was employed as the open field arena. The open field arena measures 52 cm by 52 cm. The door is white PVC plastic and the walls are gray PVC plastic. To aid in cleaning maintenance, a white 2.54 cm chamfer was added to all the inner edges. Illumination is provided by an LED Light Ring (Model: F&V R300). The light ring was calibrated to produce 600 lux of light in each arena.

b) 24-Hour Monitoring Open Field Arena

The Open Field Arena was augmented for multiple day testing. The lights 212 are in the form of overhead LED lighting set to a standard 12:12LD cycle. ALPHA-dri was placed into the arena for bedding. For providing food and water, a single Diet Gel 76A food cup was placed in the arena. This nutritional source was monitored and replaced when depleted. Each matrix was illuminated at 250 lux during the day and less than about 500 lux during the night. For recording video during the night, the lights 212 included IR LED (940 nm) lighting.

c) KOMP Open Field Arena

In addition to the custom arenas, embodiments of the disclosed systems and methods were also benchmarked on a commerically available system. The Opto-M4 Open Field Cage is constructed using clear plastic walls. As such, visual tracking becomes very difficult due to the consequential reflections. The cage measures at 42 cm by 42 cm. Lighting for this arena was done by LED illumination at 100-200 lux.

Video Acquisition

All video data was acquired by an embodiment of the video acquisition system discussed with respect to FIGS. 2 and 7. Video data was acquired at 640×480 px, resolution, 8-bit monochrome depth, and about 29 fps (e.g., about 29.9 fps), using a camera 210 in the form of Sentech cameras (Model: STC-MB33USB) and Computar lenses (Model: T3Z2910CS-IR). Exposure time and gain were controlled digitally using a target brightness of 190/255. Aperture was adjusted to its widest such that lower analog gains were used to achieve the target brightness. This in turn reduces amplification of baseline noise. Files were saved temporarily on a local hard drive using the "raw video" codec and "pa18" pixel format. Assays were run for approximately 2 hours, yielding a raw video file of approximately 50 GB. Overnight, the ffmpeg software was used to apply a 480×480 px crop, de-noise filter, and compress using the mpeg4 codec (quality set to max) which yields a compressed video size of approximately 600 MB.

Cameras 210 were mounted to the frame 202 approximately 100 cm above shelves 202b to alleviate perspective distortion. Zoom and focus were set manually to achieve a zoom of 8 px/cm. This resolution both minimizes the unused pixels on the arena border and yields approximately 800 pixels area per mouse. Although the KOMP area is slightly smaller, the same zoom of 8 px/cm target was utilized.

Figure 16:
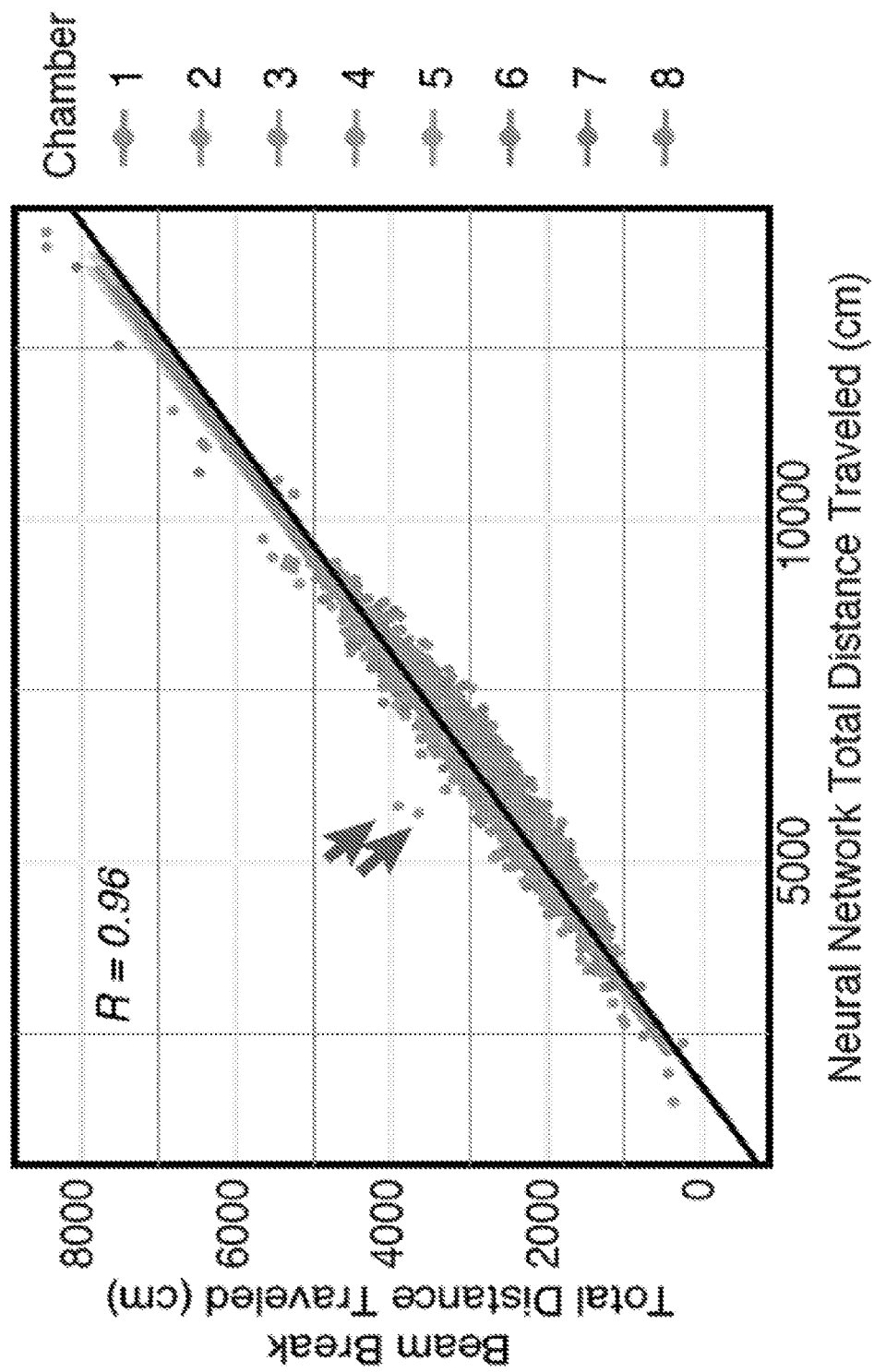
FIG. 16 is a plot comparing the performance of the segmentation network architecture of FIG. 9 with a beam break system.

2002 videos (totaling 700 hours) were tracked from the KOMP2 dataset using the encoder-decoder segmentation neural network and the results are illustrated in FIG. 8. These data included 232 knockout lines in the C57BL/6NJ background that were tested in a 20-minute open field assay. Since each KOMP2 arena has slightly different background due to the transparent matrix, tracking performance was compared to each of the 8 testing chambers (n=250 on average, FIG. 16) and to all the boxes combined. Very high correlation was observed between total distance traveled in the open field between the two approaches across all 8 testing chambers used by KOMP2 (R=96.9%). Two animals were observed with high discordance from this trend (red arrows). Observation of the video showed odd postures present for both aminals, with a waddle gait in one and a hunched posture in the other. It is believed that the waddle and hunched gaits lead to abnormal beams breaks, causing erroneously high total distance traveled measure from the beam break system. This example highlights one of the advantages of the neural network, which is unaffected by the posture of the animal.

The performance of the trained segmentation neural network was also compared with Ctrax across a broad selection of videos from the various testing environments and coat colors discussed above with respect to FIG. 8A. The Ctrax comparison is motivated by a number of reasons. In one aspect, Ctrax is considered to bone of the best conventional trackers which allows fine tuning of the many tracking settings. Ctrax is also open source and provides user support. Given the results with BGSLibrary (FIG. 8B) similar or worst performance is expected from other trackers. 12 animals per group were tracked with both a trained segmentation neural network as well as Ctrax. The settings for Ctrax were fine-tuned for each of the 72 videos, as described below.

Ctrax contains a variety of settings in order to optimize the ability to track (Branson, 2009). The authors of this software strongly recommend ensuring that the arena is set up under specific criteria to ensure good tracking. In most of the tests discussed herein (e.g., albino mice on a white background), an environment that Ctrax is not designed to perform well on is employed. Nonetheless, with well-tuned parameters, good performance is still achievable. With a large number of settings to manipulate, Ctrax can easily become a large time cost to achieve good tracking performance. The protocol for setting up Ctrax for tracking mice in the disclosed environments as follows.

In a first operation, a background model is created. The core of Ctrax is based on background subtraction, so having a robust background model is essential for functionality. Models function optimally when the mouse is moving. For creating the background model, a segment of the video is sought in which the mouse is clearly moving and sample frames from that section. This ensures that the mouse is not included in the background model. This approach significantly improves Ctrax's tracking performance on the 24 hour data, as the mouse infrequently moves and would typically be incorporated into the background model.

The second operation is to set the settings for background subtraction. Here, the Background Brightness normalization method is used with a Std Range of 254.9 to 255.0. The thresholds applied to segment out the mouse are tuned on a per-video basis as slight changes in exposure and coat color will influence the performance. To tune these thresholds, a pod set of starting values is applied and the video is reviewed to ensure generally good performance. In certain embodiments, every video can be checked for instances of the mouse tearing on the wall, as these are typically the most difficult names to track due to shadows. Additionally, morphological filtering can be applied to remove sparse changes in the environment, as well as to remove the tail of the mouse for fitting an ellipse. An opening radius of 4 and a closing radius of 5 were employed.

In a further operation, a variety of tracking parameters that Ctrax enables are manually adjusted to ensure the observations are in fact mice. Under consideration of time, these parameters were tuned well once and then used for all other mice tracked. If a video was noticeably performing poorly, the general settings were tweaked to improve performance. For the shape parameters, bounds based on 2 standard deviations were determined from an individual black mouse video. The minimum values were further lowered as it was expected that certain mice would perform poorly un the segmentation step. This allows Ctrax to still find a good location of the mouse despite not being able to segment the entirety of the mouse. This approach functions well, as the setups all have the same zoom of 8 and the mice tested are generally the same shape. Motion settings are very lenient, because the experimental setup only tracks one mouse in the arena. Under observation parameters, the "Min Area Ignore" is primarily utilized, which filters out large detections. Here, detections larger than 2500 are filtered out. Under the hindsight tab, the "Fix Spurious Detection" setting is used to remove detections shorter than 500 fames length.

Figure 17B:
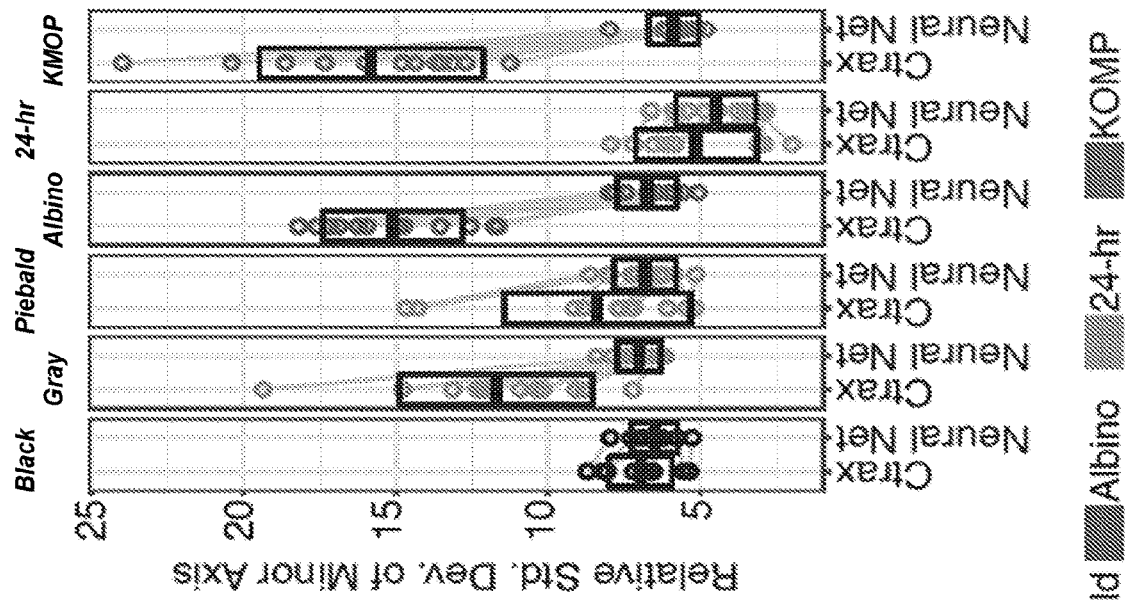
FIG. 17B is a plot of relative standard deviation of minor axis predictions determined by the segmentation network architecture of FIG. 9.
Figure 17A:
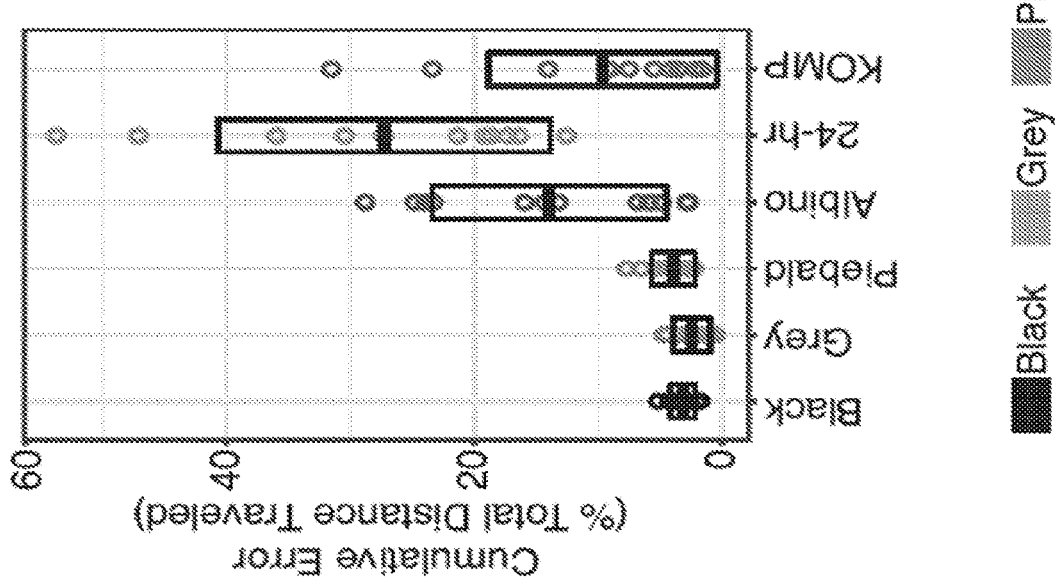
FIG. 17A is a plot illustrating predictions from as embodiment of the present disclosure and Ctrax.

Videos from the 24 hour apparatus, where animals, were sleeping continually for the full hour, were manually omitted from comparison as Ctrax could not produce a valid background model. A cumulative relative error of total distance traveled between Ctrax and the neural network was calculated and is illustrated in (FIG. 17A). For every minute in the video, a comparison is made between the distance traveled prediction from both the neural network and Ctrax. This metric measures the accuracy of center of mass tracking of each mouse. Tracking for black, gray, and piebald mice showed errors less than 4%. However significantly higher levels of error were seen in albino (14%), 24-hour arena (27% orange), and KOMP2(10%, Blue) (FIG. 17A). Thus, track albino, KOMP2, or 24-hour data could not be adequately tracked without the neural network tracker.

It was also observed that when foreground segmentation prediction is incorrect, such as when shadows are included in the prediction, the ellipse fit does not correctly represent the posture of the mouse. In these cases, even though the center of mass tracking was acceptable, the ellipse fit itself was highly variable.

Modern machine learning software for behavior recognition, such as JAABA (Kabra, 2013), utilize these features for classification of behaviors. The variance in ellipse tracking was quantized through the relative standard deviation of the minor axis and is illustrated in FIG. 17B. This metric shows the least variance across all laboratory mice because the width of an individual mouse remains similar through a wide range of postures expressed in behavioral assays when tracking is accurate. High tracking variation was observed with grey and piebald mice (FIG. 17A) even though there is low error cumulative relative en of total distance traveled (FIG. 17B). As expected high relative standard deviation of the minor axis is observed for albino and KOMP2 tracking. Thus, for both center of mass tracking and variance of ellipse fit, the neural network tracker is found to outperform traditional trackers.

Having established the der-decoder segmentation neural network as a highly accurate tracker, it performance was further tested with two large behavioral datasets. Open held video data was generated with 1845 mice (1691 hours) across 58 strains of mice, including all various colors, piebald, nude, and obese mice. This dataset included 47 inbred, 11 isogenic F1 mouse strains and is the largest open field dataset generated according to the Mouse Phenome Database of Bogue, 2018.

Figure 18A:
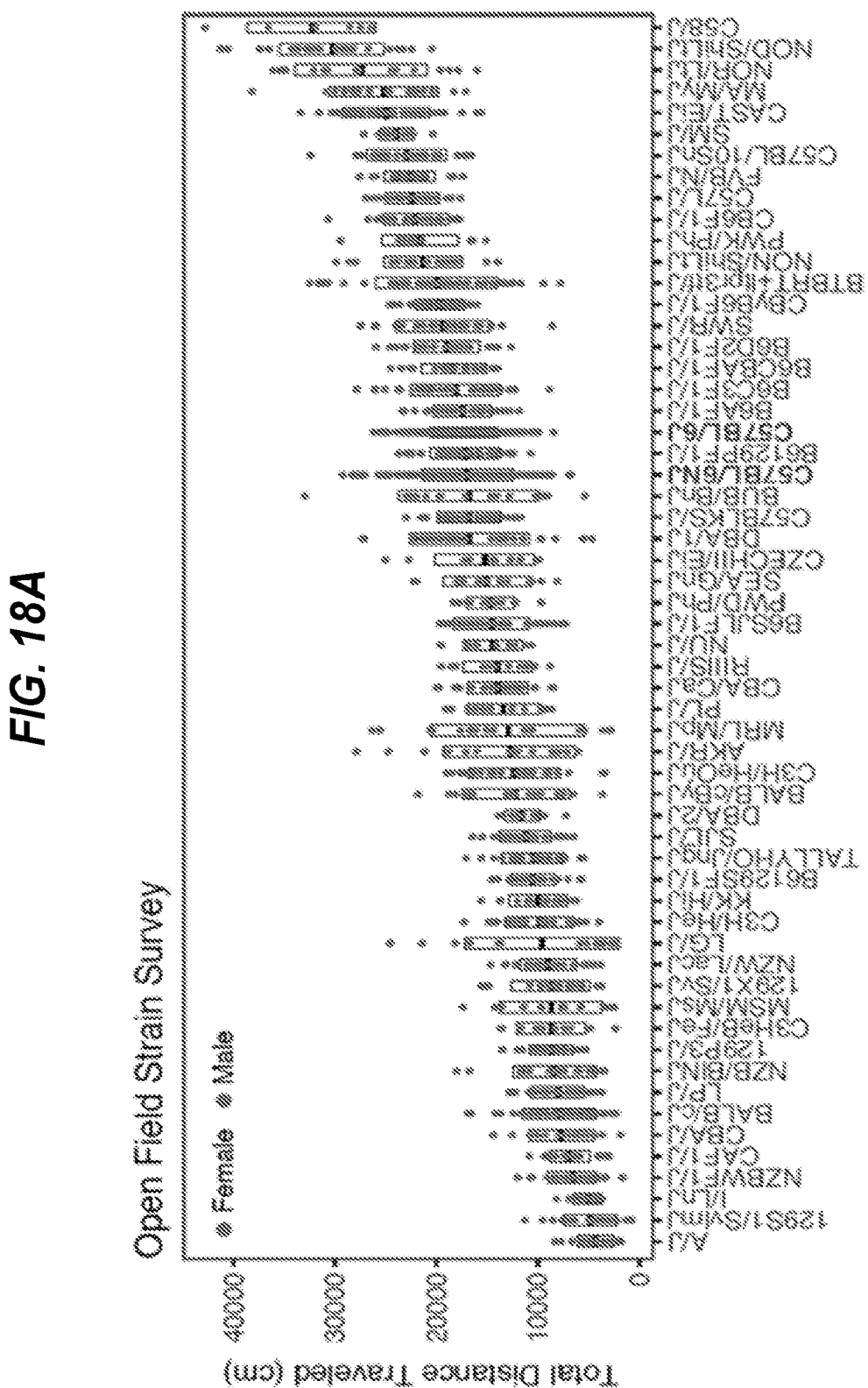
FIG. 18A is a plot of total distance tracked for a large strain survey of genetically diverse animals determined by the segmentation network architecture of FIG. 9.

Tracking results for total distance traveled are illustrated in FIG. 18A. Points indicate individuals in a strain, boxes indicate mean +/− standard deviation. Using a single trained network without any user tuning, all mice were tracked with high accuracy. Mice from a majority of the strains were visually checked for fidelity of tracking and observed excellent performance. The activity phenotypes observed agree with previously published datasets of mouse open field behavior.

Figure 18B:
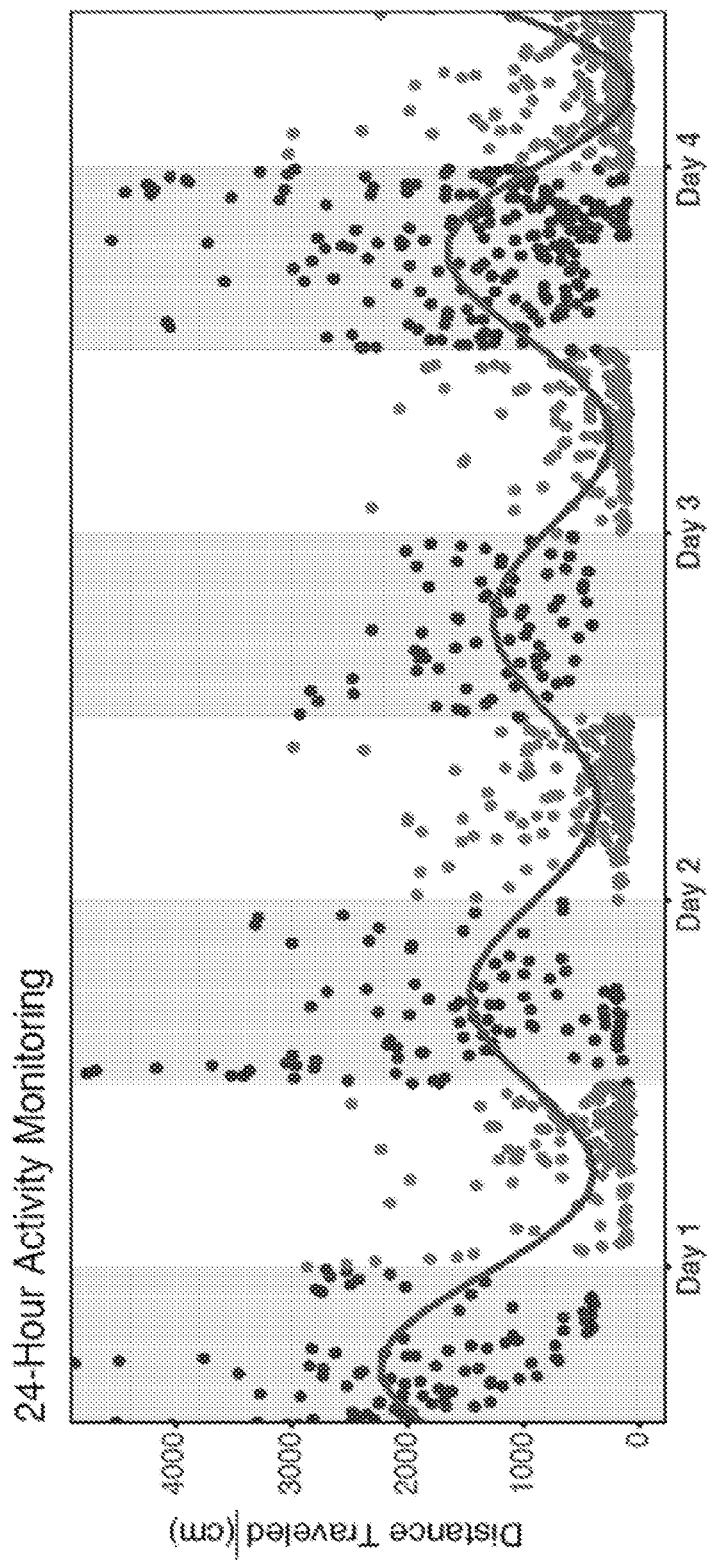
FIG. 18B is a plot of circadian activity pattern observed in six animals continuously tracked over 4 days in a dynamic environment determined by the segmentation network architecture of FIG. 9.

The same neural network was employed to track 24-hour video data collected for four C57BL/6J and two BTBR T$^+$ ltpr3*tf*/J mice (FIG. 8A, column 5). These mice were housed with bedding, food and water cup over multiple days, during which the food changed location and under 12:12 light-dark conditions. Video data was recoded using visible and infra-red light sources. Activity was tracked across all animals under these conditions using the same network and very good performance was observed under light and dark conditions Results are illustrated in FIG. 18B, with 8 light points representing light conditions and dark points representing dark conditions, respectively. As expected, activity rhythms (curve) were observed with high levels of locomotor activity during the dark phase.

In summary, video based tracking of animals in complex environments has been a long-standing challenge in the field of animal behavior (Egnor, 2016). Current state of the at systems do not address the fundamental issue of animal segmentation and rely heavily on visual contrast between the foreground and background for accurate tracking. As a result, the user must restrict the environment to achieve optimal results.

A modern neural network based tracker and corresponding methods of use are described herein that are able to function in complex and dynamic environments. A fundamental issue in tracking, foreground and background segmentation, is addressed through the use of a trainable neural network. Tests of three different architectures find that an encoder-decoder segmentation network achieves high level of accuracy and functions at high speed (over 6× real time).

A labeling interface is further provided that allows a user to train a new network for their specific environment by labeling as little as 2,500 images, which takes approximately 3 hours.

The disclosed trained neural network has been compared to two existing solutions and find it vastly outperforms them in complex environments. Similar results are expected with any off the shelf system that utilizes background subtraction approaches. In fact, when testing 26 different background subtraction methods, it was observed that each failed under certain circumstances. However, a single neural network architecture is capable of functioning for all coat colors of mice under multiple environments, without the need for fine tuning or user input. This machine learning approach enables long-term tracking under dynamic environmental conditions with minimal user input, thus forming the basis of the next generation of tracking architecture for behavioral research.

One or more aspects or features of the control systems described herein can be realized in digital electronic circuitry, integrated circuitry, specially designed application specific integrated circuits (ASICs) field programmable gate arrays (FPGAs) computer hardware firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computer system may include clients and servers. A client and server are generally remote from each other and typically interact through a communication network. The relationship of client and server arises by virtue of computer programs running on the respective computers and having a client-server relationship to each other.

The computer programs, which can also be referred to as programs, software, software applications, applications, components, or code, include machine instructions for a programmable process, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, e.g., a mouse, a trackball, etc., by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include but are not limited to, touch screens or other touch-sensitive devices such as single or multi-point resistive or capacitive trackpads, voice recognition hardware and software, optical scanners, optical pointers, digital image capture devices and associated interpretation software, and the like.

All references cited throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in this application. For example, a reference that is partially inconsistent is incorporated by reference except for the partially inconsistent portion of the reference.

When a Markush group, or other grouping is used herein, all individual members of the group and all combinations and sub-combinations possible of the group are intended to be individually included in the disclosure.

As used herein, the singular forms "a," "an," and "the" include plural reference unless the context clearly dictates otherwise. Thus, for example, reference to "a cell" includes a plurality of such cells and equivalents thereof known to those skilled in the art, and so forth. Additionally, the terms "a" (or "an"), "one or more" and "at least one" can be used interchangeably herein.

As used herein, the term "comprising" is synonymous with "including," "having," "containing," and "characterized by" and each can be used interchangeably. Each of these terms is further inclusive or open-ended and do not exclude additional, unrecited elements or method steps.

As used herein, the term "consisting of" excludes any element, step, or ingredient not specified in the claim element.

As used herein, the term "consisting essentially of" does not exclude materials or steps that do not materially affect the basic and novel characteristics of the claim. In each instance herein any of the terms "comprising", "consisting essentially of," and "consisting of" can be replaced with either of the other two terms.

The embodiments illustratively described herein suitably can be practiced in the absence of any element or elements, limitation or limitations which is not specifically disclosed herein.

The expression "of any of claims XX-YY" (where XX and YY refer to claim numbers) is intended to provide a multiple dependent claim in the alternative form and in some embodiments can be interchangeable with the expression "as in any one of claims XX-YY."

Unless defined otherwise, all technical and scientific terms used herein have the same meanings as commonly understood by one of ordinary skill in the art to which the disclosed embodiments belong.

Whenever a range is given in the specification, for example, a temperature range, a time range, a composition range, or a concentration range, all intermediate ranges and sub-ranges, as well, as all individual values included in the ranges given, are intended to be included in the disclosure. As used herein, ranges specifically include the values provided as endpoint values of the range. For example, a range of 1 to 100 specifically includes the end point values of 1 and 100. It will be understood that any subranges or individual values in a range or sub-range that are included in the description herein can be excluded from the claims herein.

In the descriptions above and in the claims, phrases such as "at least one of" or "one or more of" can occur followed by a conjunctive list of dements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or mare of A, B, and C;" and "A, B, and/or C" are each intended to mean "A alone, B alone, C alone, A and B together, A and C together, B and C together, or A and B and C together." In addition, use of the term "based on," above and in the claims is intended to mean. "based at least in part on," such that an unrecited feature or element is also permissible.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the claimed embodiments. Thus, it should be understood that although the present application can include discussion of preferred embodiments, exemplary embodiments and optional features, modification and variation of the concepts herein disclosed can be resorted to by those skilled in the art. Such modifications and variations are considered to be within the scope of the disclosed embodiments, as defined by the appended claims. The specific embodiments provided herein are examples of useful embodiments of the present disclosure and it will be apparent to one skilled in the art that they can be carried out using a large number of variations of the devices, device components, and methods steps set forth in the present description. As will be obvious to one of skill in the art, methods and devices useful for the present methods can include a large number of optional compositions and processing elements and steps.

Embodiments of the disclosure can be embodied in other specific forms without departing from the spirit or esssential characteristics thereof. The foregoing embodiments are therefore to be considered in all respects illustrative rather than limiting on the subject matter described herein.

REFERENCES

Each of the references listed below are hereby incorporated by reference in their entirety.

Bargmann, C., Newsome, W., Anderson, A., Brown, E., Deisseroth, K., Donoghue, J., MacLeish, P., Marder, E., Normann, R., and Sanes, J., BRAIN 2025: a scientific vision. Brain Research Through Advancing Innovative Neurotechnologies (BRAIN) Working Group Report to the Advisory Committee to the Director, NIH (2014).

Bogue, M. A. et al., "Mouse Phenome Database, an integrative database and analysis suite for curated empirical phenotype data from laboratory mice," *Nucleic Acids Res,* 46, D843-D850 (2018).

Branson, K. Robie, A. A., Bender. J., Perona, P & Dickinson, M. H., "High-throughput ethomics in large groups of *Drosophila,*" *Nature methods,* 6(6), 451-457 (2009).

Branson, K. and Belongie, S., "Tracking Multiple Mouse Contour (Without Too Many Samples)," 2005 IEEE Computer Society Conference on Computer Vision and Pattern (CVPR '05), June 20-25, San Diego, Calif. pp. 1039-1046 (2005).

Decoster, W., and Debruyne, F., "The aging voice, changes in fundamental frequency, waveform stability and spectrum," *Acta Otorhinolaryngol Beig* 51, pp. 105-112 (1997).

Deschenes, M., Moore, J., and Kleinfeld, D., "Sniffing and whisking in rodents," *Curr Opin Neurobiol,* 22, pp. 243-230 (2012).

Egnor, S. E., and Branson, K., "Computational Analysis of Behavior," *Annu Rev. Neurosci,* 39, pp. 217-236 (2016).

Gomez-Marin, A., Paton, J. J., Kampff, A. R., Costa R. M., and Mainen, Z. F., "Big behavioral data: psychology, ethology and the foundations of neuroscience," *Nat Neurosci,* 17, pp. 1455-1462(2014).

Goodfellow, I., Bengio, Y., and Courville, A. *Deep Learning,* MIT Press (2016).

Grimsley, J. M., Monaghan, J. J., and Wettstrup, J. J., "Development of social vocalizations in mice," *PLoS One,* 6, e17460 (2011).

He, K., Zhang, X., Ren, S. & Sun, J. in European Conference on Computer Vision Springer, pp. 630-645 (2016).

Heckman, J. J., Proville, R., Heckman, G. J., Azarfar, A., Celikel, T., and Englitz, B., "High-precision spatial localization of mouse vocalizations during social interaction," *Sci Rep,* 7(7), 3017 (2017).

Kabra, M., Robie, A. A., Rivera-Alba, M., Branson, S. & Branson, K., "JAABA: interactive machine learning for automatic annotation of animal behavior," *Nat Methods*, 10, pp. 64-67(2013).

Kalueff, A. V., LaPorte, J. L., and Bergner, C. L., *Neurobiology of grooming behavior* Cambridge; New York: Cambridge University Press (2010).

Krizhevsky, A., Sutskever, I., and Hinton, G. E., "ImageNet classification with deep convolutional neural networks," *Advances in neural information processing systems* 25 (*NIPS* 2012).

Kulesskaya, N. & Voikar, V., "Assessment of mouse anxiety-like behavior in the light-dark box and open-field arena: role of equipment and procedure," *Physiol Behav* 133, 30-38 (2014).

Kumar, V., Kim, K., Chryshanthi, J. Thomas, L. C., Hong, H., and Takahashi, J. S., "Second-generation high-throughput forward genetic screen in mice to isolate subtle behavioral mutants," *Proceedings of the National Academy of Sciences*, 108 (Supplement 3), pp. 15557-1564 (2011).

LeCun, Y., Bengio, Y. & Hinton, G., "Deep learning," *Nature* 521, 436-444 (2015).

Martins, R. H., Goncalvez, T. M., Pessin, A. B., and Branco, A., "Aging voice: presbyphonia," *Aging Clin Exp Res*, 26, pp. 1-5 (2014).

Mueller, P. B., "The aging voice," *Senrin Speech Lang*," 18(2), pp. 159-169 (1997).

Neunuebel, J. P., Taylor, A. L., Arthur, B. J., and Egnor, S. E., "Female mice ultrasonically interact with males during courtship displays," *Elife*, 4:e06203, (2015).

Ohayon, S., Avni, O., Taylor, A. L., Perona, P., and Roian Egnor, S. E., "Automated multi-day tracking of marked mice for the analysis of social behaviour," *J. Neurosci. Methods*, 219(1), pp. 10-19 (2013).

Shannon, C. E., "Communication in the presence of noise," *Proceedings of the IRE*, 37(1), pp. 10-21 (1949).

Sobral, A., "BCSLibrary: An OpenCV C++ Background Subtraction Library," in IX Workshop de Visão Computacional (WVC 2013) Vol. 2 7 (2013).

Valdez, P., & Mehrabian, A., "Effects of color on emotions," *Journal of experimental psychology: General*, 123(4), pp. 394-409 (1994).

Wiltschko, A. B., Johnson, M. J., Iurilli, G., Peterson, R. E., Katon, J. M., Pashkovski, S. L., Abraira, V. E., Adams, R. P., and Datta, S. R., "Mapping Sub-Second Structure in Mouse Behavior," *Neuron*, 88, pp. 1121-1135 (2015).

Zhang, C., Florêncio, D., Ba, D. E., and Zhang, Z., "Maximum likelihood sound source localization and beamforming for directional microphone arrays in distributed meetings," *IEEE Transactions on Multimedia*, 10, pp. 538-548 (2008).

Zoph, B., Vasudevan, V., Shlens, J. & Le, Q. V., "Learning transferable architectures for scalable image recognition," *arXiv preprint arXiv:*1707.07012 (2017).

What is claimed is:

1. A system, comprising:
an enclosure dimensioned to house an animal, the enclosure including a door configured to permit access to an interior of the enclosure; and
an acquisition system, including:
a camera;
at least two sets of light sources, each set of light sources being configured to emit light at a wavelength different from the other and incident upon the enclosure,
wherein the camera is configured to acquire video data of at least a portion of the enclosure when illuminated by at least one of the sets of light sources; and
a controller in electrical communication with the camera and the sets of light sources, the controller configured to:
generate control signals operative to control acquisition of video data by the camera;
generate control signals operative to control emission of light by the sets of light sources to simulate light and dark cycles and to elicit different behavior from the animal;
compress file size of the acquired video data; and
filter background noise of the acquired video data, wherein the compressed and filtered video data is used as input data capable of improving performance of animal tracking executed by a convolutional neural network (CNN).

2. The system of claim 1, wherein at least a portion of the enclosure is formed from a material that is opaque to visible light wavelengths.

3. The system of claim 1, wherein at least a portion of the enclosure is formed from a material that is non-reflective to infrared light wavelengths.

4. The system of claim 1, wherein the camera is configured to acquire video data at a resolution of at least 480×480 pixels.

5. The system of claim 1, wherein the camera is configured to acquire video data a frame rate of at least 29 frames per second.

6. The system of claim 1, wherein the camera is configured to acquire video data possessing at least 8-bit depth.

7. The system of claim 1, wherein the camera is configured to acquire video data at infrared wavelengths.

8. The system of claim 1, wherein a first set of light sources comprises one or more first lights configured to emit light at one or more visible light wavelengths and a second set of light sources comprises one or more second lights configured to emit light at one or more infrared (IR) light wavelengths.

9. The system of claim 8, wherein the controller is configured to command the first light source to illuminate the enclosure with visible light possessing an intensity of 50 lux to 800 lux during the light portion of the light/dark cycle.

10. The system of claim 8, wherein the controller is configured to command the second light source to illuminate the enclosure with infrared light, wherein a temperature of the enclosure is raised by less than 5° C. by the infrared illumination.

11. The system of claim 8, wherein the controller is configured to command the first light source to illuminate the enclosure according to 1024 levels of lighting scaled logarithmically.

12. The system of claim 1, wherein the enclosure includes objects other than the animal, wherein the video data acquired by the camera includes the objects and the animal, and wherein the compressed and filtered video data is processed using the CNN architecture capable of identifying the objects and the animal.

13. The system of claim 1, wherein the controller uses Dirac, H264, or MPEG4 codec to compress the acquired video data.

14. The system of claim 1, wherein the controller uses HQDN3D filter on the acquired video data.

15. The method of claim 1, wherein filtering the acquired video data by the controller comprises using HQDN3D filter.

16. A method, comprising:
- illuminating, by at least one set of light sources, an enclosure configured to house an animal, each set of light sources being configured to emit light at a wavelength different from the other;
- acquiring, by a camera, video data of at least a portion of the enclosure that is illuminated by at least one of the sets of light sources;
- generating, by a controller in electrical communication with the camera, control signals operative to control acquisition of video data by the camera;
- generating, by the controller in electrical communication with the set of light sources, control signals operative to control emission of light by the set of light sources to simulate light and dark cycles and to elicit different behavior from the animal;
- receiving, by the controller, video data acquired by the camera;
- compressing, by the controller, file size of the acquired video data; and
- filtering, by the controller, background noise of the acquired video data, wherein the compressed and filtered video data is used as input data capable of improving performance of animal tracking executed by a convolutional neural network (CNN).

17. The method of claim 16, wherein the camera is configured to acquire video data at infrared wavelengths.

18. The method of claim 17, wherein generating, by the controller, control signals operative to control emission of light comprises generating at least a first control signal to command the first light source to illuminate the enclosure with visible light possessing an intensity of 50 lux to 800 lux during the light cycle.

19. The method of claim 17, wherein generating, by the controller, control signals operative to control emission of light comprises generating at a first control signal to command the second light source to illuminate the enclosure with infrared light, wherein a temperature of the enclosure is raised by less than 5° C. by the infrared illumination.

20. The method of claim 17, wherein generating, by the controller, control signals operative to control emission of light comprises generating at a first control signal to command the first light source to illuminate the enclosure according to 1024 levels of lighting scaled logarithmically.

21. The method of claim 16, wherein the camera is configured to acquire video data at a resolution of at least 480×480 pixels.

22. The method of claim 16, wherein a first set of light sources comprises one or more first lights configured to emit light at one or more visible light wavelengths and a second set of light source comprises one or more second lights configured to emit light at one or more infrared (IR) light wavelengths.

23. The method of claim 16, wherein the enclosure includes objects other than the animal, wherein the video data acquired by the camera includes the objects and the animal, and wherein the method further comprises processing the compressed and filtered video data using the CNN architecture capable of identifying the objects and the animal.

24. The method of claim 16, wherein compressing the acquired video data by the controller comprises using Dirac, H264, or MPEG4 codec.

* * * * *